United States Patent
Sun et al.

(10) Patent No.: US 10,873,938 B2
(45) Date of Patent: Dec. 22, 2020

(54) RATE MATCHING FOR BROADCAST CHANNELS

(71) Applicant: QUALCOMM Incorporated, San Diego, CA (US)

(72) Inventors: Jing Sun, San Diego, CA (US); Wanshi Chen, San Diego, CA (US); Tao Luo, San Diego, CA (US); Juan Montojo, San Diego, CA (US); Peter Gaal, San Diego, CA (US); Heechoon Lee, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/128,405

(22) Filed: Sep. 11, 2018

(65) Prior Publication Data

US 2019/0110290 A1    Apr. 11, 2019

(30) Foreign Application Priority Data

Oct. 9, 2017 (GR) .............................. 20170100464

(51) Int. Cl.
*H04W 48/20* (2009.01)
*H04W 72/04* (2009.01)
(Continued)

(52) U.S. Cl.
CPC ....... *H04W 72/0446* (2013.01); *H04L 5/0053* (2013.01); *H04W 24/08* (2013.01);
(Continued)

(58) Field of Classification Search
None
See application file for complete search history.

(56) References Cited

U.S. PATENT DOCUMENTS 8,908,645 B2 * 12/2014 Chen .................... H04B 17/382
370/331
9,516,653 B2 * 12/2016 Yang ................. H04W 72/0446
(Continued)

OTHER PUBLICATIONS

Ericsson: "On Configuration of Control Resource Sets and Search Space", 3GPP Draft, R1-1718628, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051341802, 11 Pages, Retrieved from the Internet: URL:http://www.3gpp.org/ftp/Meetings_3GPP_SYNC/RAN1/Docs/ [retrieved on Oct. 8, 2017].

(Continued)

*Primary Examiner* — Sithu Ko
(74) *Attorney, Agent, or Firm* — Paul Kuo

(57) ABSTRACT

Methods, systems, and devices for wireless communications are described. A method may include receiving, from a base station and while being outside of a radio resource control (RRC) connected state, an indication of a length of downlink symbols used to transmit a physical downlink shared channel (PDSCH) that carries broadcast information, and decoding the PDSCH based on the indication. Another method may include receiving, from a base station, a PDSCH that carries broadcast information over a plurality of downlink symbols and while being outside of an RRC connected state, perform a first blind decoding of the PDSCH over a first set of the plurality of downlink symbols, and perform a second blind decoding of the PDSCH during a second set of the plurality of downlink symbols, the second set being different in length than the first set.

48 Claims, 18 Drawing Sheets

(51) Int. Cl.
  *H04W 24/08* (2009.01)
  *H04L 5/00* (2006.01)
  *H04L 27/26* (2006.01)

(52) U.S. Cl.
  CPC ......... *H04W 72/042* (2013.01); *H04L 5/0007* (2013.01); *H04L 5/0044* (2013.01); *H04L 27/2649* (2013.01)

(56) References Cited

U.S. PATENT DOCUMENTS

| | | | | |
|---|---|---|---|---|
| 9,706,505 | B2* | 7/2017 | Pietraski | H04L 5/0073 |
| 9,820,254 | B2* | 11/2017 | Mochizuki | H04W 60/04 |
| 9,894,688 | B2* | 2/2018 | Chae | H04W 68/005 |
| 10,231,193 | B2* | 3/2019 | Lee | H04W 52/383 |
| 2010/0290419 | A1* | 11/2010 | Wengerter | H04W 72/0446 370/329 |
| 2012/0287885 | A1* | 11/2012 | Dai | H04W 72/044 370/329 |
| 2013/0114419 | A1* | 5/2013 | Chen | H04W 72/044 370/248 |
| 2016/0037498 | A1* | 2/2016 | Chen | H04L 5/0053 370/329 |
| 2016/0301555 | A1* | 10/2016 | Nory | H04L 1/0052 |
| 2017/0019915 | A1* | 1/2017 | Nogami | H04L 5/001 |
| 2017/0100464 | A1 | 4/2017 | Dobboletta | |
| 2017/0265168 | A1* | 9/2017 | Wang | H04L 67/12 |
| 2017/0289966 | A1* | 10/2017 | Islam | H04W 72/042 |
| 2017/0311290 | A1* | 10/2017 | Adjakple | H04W 36/00 |
| 2018/0192383 | A1* | 7/2018 | Nam | H04J 11/0076 |
| 2018/0220400 | A1* | 8/2018 | Nogami | H04L 5/0078 |
| 2018/0288744 | A1* | 10/2018 | Wang | H04L 1/1861 |
| 2019/0036658 | A1* | 1/2019 | Kim | H04L 5/0055 |
| 2019/0068343 | A1* | 2/2019 | Kwak | H04W 72/04 |
| 2019/0223094 | A1* | 7/2019 | Ingale | H04W 68/005 |

OTHER PUBLICATIONS

International Search Report and Written Opinion—PCT/US2018/050605—ISA/EPO—dated Dec. 3, 2018.
LG Electronics: "Discussion on Search Space Design", 3GPP Draft, R1-1717952 Search Space Design Final, 3rd Generation Partnership Project (3GPP), Mobile Competence Centre, 650, Route Des Lucioles, F-06921, Sophia-Antipolis Cedex, France, vol. RAN WG1, No. Prague, CZ, Oct. 9, 2017-Oct. 13, 2017, Oct. 8, 2017 (Oct. 8, 2017), XP051341136, 11 Pages, Retrieved from the Internet:URL:http://www.3gpp.org/ftp/Meetings_3GPP_SYNC/RAN1/Docs/ [retrieved on Oct. 8, 2017].

* cited by examiner

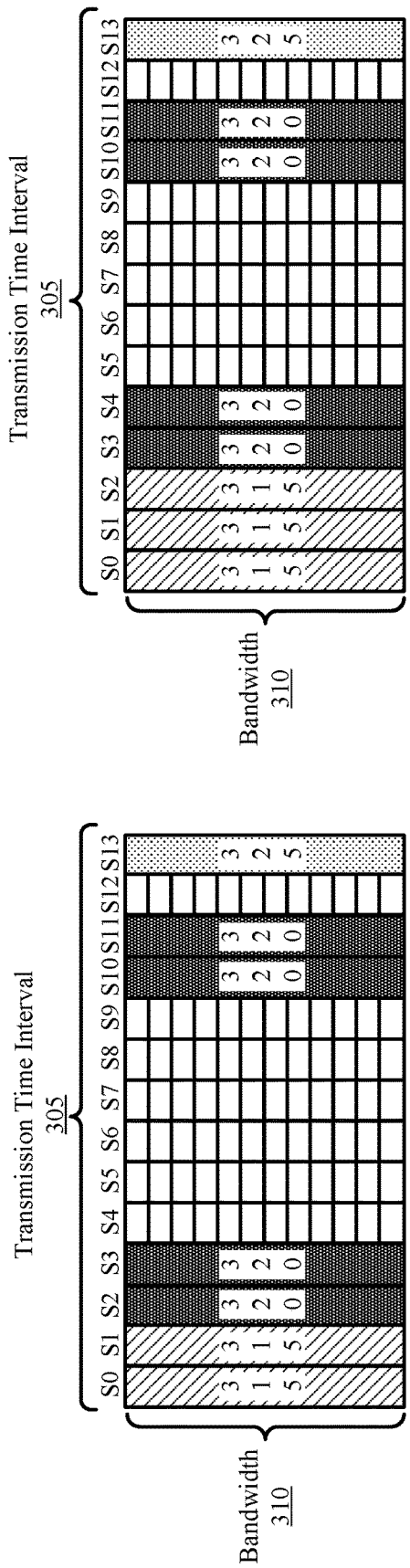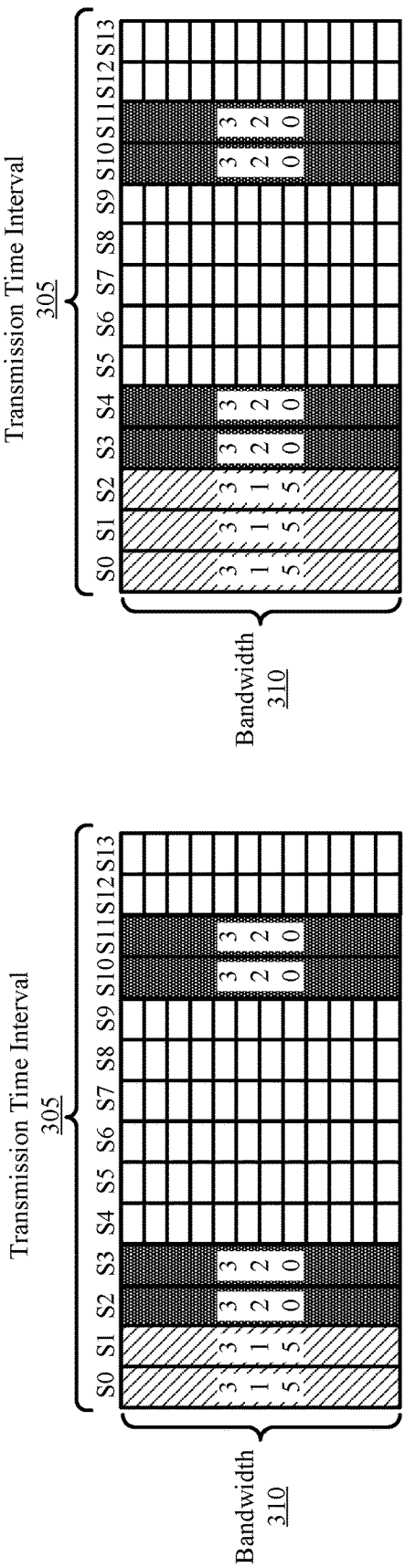

RATE MATCHING FOR BROADCAST CHANNELS

CROSS REFERENCES

The present Application for Patent claims benefit of Greek Patent Application No. 20170100464 by SUN, et al., entitled "RATE MATCHING FOR BROADCAST CHANNELS," filed Oct. 9, 2017, assigned to the assignee hereof, and expressly incorporated by reference in its entirety.

BACKGROUND

The following relates generally to wireless communication and to rate matching for broadcast channels.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (OFDM) (DFT-s-OFDM). A wireless multiple-access communications system may include a number of base stations or network access nodes, each simultaneously supporting communication for multiple communication devices, which may be otherwise known as user equipment (UE).

Wireless communications systems may operate in millimeter wave (mmW) frequency ranges, (e.g., 28 GHz, 40 GHz, 60 GHz, etc). In some cases, transmissions from the base station and the UE may be beamformed. That is, wireless communications between a base station and a UE, may use beams or beamformed signals for transmission or reception. A base station may transmit beamformed signals on one or more downlink transmission beams, and a UE may receive a signal on one or more downlink receive beams. Similarly, a UE may transmit beamformed signals on one or more uplink transmission beams, and a base station may receive beamformed signals on one or more uplink receive beams.

SUMMARY

The described techniques relate to improved methods, systems, devices, or apparatuses that support rate matching for broadcast channels. Generally, the described techniques allow a base station (e.g., next generation NodeBs (gNB)) to indicate to a user equipment (UE) appropriate resources (e.g., a length of downlink symbols from a starting downlink symbol index to an ending downlink symbol index) for the UE to monitor. The UE may receive additional broadcast information (e.g., remaining minimum system information (RMSI) or other system information (OSI)) from the base station on a broadcast channel (e.g., physical downlink shared channel (PDSCH)). Specifically, a base station may transmit to the UE a length of downlink symbols used to transmit a PDSCH that carries broadcast information while the UE is outside of a radio resource control (RRC) connected state. The UE may monitor the downlink symbols to receive the additional broadcast information from the base station by processing (e.g., demodulate, decode, and/or rate match) the PDSCH during the indicated downlink symbols.

A method of wireless communications at a UE is described. The method may include receiving, from a base station, a PDSCH over a plurality of downlink symbols and while being outside of a RRC connected state, the PDSCH carrying broadcast information, performing a blind decoding of the PDSCH over a first set of the plurality of downlink symbols, and performing a blind decoding of the PDSCH during a second set of the plurality of downlink symbols, the second set being different in length than the first set.

An apparatus for wireless communications is described. The apparatus may include means for receiving, from a base station, a PDSCH over a plurality of downlink symbols and while being outside of a RRC connected state, the PDSCH carrying broadcast information, means for performing a blind decoding of the PDSCH over a first set of the plurality of downlink symbols, and means for performing a blind decoding of the PDSCH during a second set of the plurality of downlink symbols, the second set being different in length than the first set.

Another apparatus for wireless communications is described. The apparatus may include a processor, memory in electronic communication with the processor, and instructions stored in the memory. The instructions may be operable to cause the processor to receive, from a base station, a PDSCH over a plurality of downlink symbols and while being outside of a RRC connected state, the PDSCH carrying broadcast information, perform a blind decoding of the PDSCH over a first set of the plurality of downlink symbols, and perform a blind decoding of the PDSCH during a second set of the plurality of downlink symbols, the second set being different in length than the first set.

A non-transitory computer-readable medium for wireless communications is described. The non-transitory computer-readable medium may include instructions operable to cause a processor to receive, from a base station, a PDSCH over a plurality of downlink symbols and while being outside of a RRC connected state, the PDSCH carrying broadcast information, perform a blind decoding of the PDSCH over a first set of the plurality of downlink symbols, and perform a blind decoding of the PDSCH during a second set of the plurality of downlink symbols, the second set being different in length than the first set.

Some examples of the method, apparatus, and non-transitory computer-readable medium described above may further include processes, features, means, or instructions for selecting the first set of the plurality of downlink symbols or the second set of the plurality of downlink symbols based at least in part on a preconfigured rule. In some examples of the method, apparatus, and non-transitory computer-readable medium described above, the preconfigured rule comprises a minimum number of downlink symbols or a maximum number of downlink symbols of the plurality of downlink symbols.

In some examples of the method, apparatus, and non-transitory computer-readable medium described above, the minimum number of downlink symbols or the maximum number of downlink symbols, or both, may be indicated in downlink control information (DCI). In some examples of the method, apparatus, and non-transitory computer-readable medium described above, the minimum number of downlink symbols or the maximum number of downlink symbols, or both, may be predefined.

Some examples of the method, apparatus, and non-transitory computer-readable medium described above may further include processes, features, means, or instructions for performing a soft combining of LLRs of coded bits of the PDSCH based at least in part on the coded bits being within the minimum number of downlink symbols. Some examples of the method, apparatus, and non-transitory computer-readable medium described above may further include processes, features, means, or instructions for selecting the first set of the plurality of downlink symbols based at least in part on the preconfigured rule, wherein performing the blind decoding of the PDSCH may be based at least in part on the selected first set of the plurality of downlink symbols.

Some examples of the method, apparatus, and non-transitory computer-readable medium described above may further include processes, features, means, or instructions for selecting the second set of the plurality of downlink symbols based at least in part on the preconfigured rule, wherein performing the blind decoding of the PDSCH may be based at least in part on the selected second set of the plurality of downlink symbols. In some examples of the method, apparatus, and non-transitory computer-readable medium described above, the broadcast information comprises RMSI or OSI, or both.

A method of wireless communications at a UE is described. The method may include receiving, from a base station and while being outside of a RRC connected state, an indication of a length of downlink symbols used to transmit a PDSCH that carries broadcast information, the length being from a starting downlink symbol index to an ending downlink symbol index, and decoding the PDSCH based at least in part on the indication.

An apparatus for wireless communications is described. The apparatus may include means for receiving, from a base station and while being outside of a RRC connected state, an indication of a length of downlink symbols used to transmit a PDSCH that carries broadcast information, the length being from a starting downlink symbol index to an ending downlink symbol index, and means for decoding the PDSCH based at least in part on the indication.

Another apparatus for wireless communications is described. The apparatus may include a processor, memory in electronic communication with the processor, and instructions stored in the memory. The instructions may be operable to cause the processor to receive, from a base station and while being outside of a RRC connected state, an indication of a length of downlink symbols used to transmit a PDSCH that carries broadcast information, the length being from a starting downlink symbol index to an ending downlink symbol index, and decode the PDSCH based at least in part on the indication.

A non-transitory computer-readable medium for wireless communications is described. The non-transitory computer-readable medium may include instructions operable to cause a processor to receive, from a base station and while being outside of a RRC connected state, an indication of a length of downlink symbols used to transmit a PDSCH that carries broadcast information, the length being from a starting downlink symbol index to an ending downlink symbol index, and decode the PDSCH based at least in part on the indication.

In some examples of the method, apparatus, and non-transitory computer-readable medium described above, the broadcast information comprises RMSI or OSI, or both. In some examples of the method, apparatus, and non-transitory computer-readable medium described above, the length may be a fixed length of downlink symbols.

Some examples of the method, apparatus, and non-transitory computer-readable medium described above may further include processes, features, means, or instructions for receiving a DCI from the base station, wherein the indication of the length of downlink symbols used to transmit the PDSCH by the base station may be received in the DCI. Some examples of the method, apparatus, and non-transitory computer-readable medium described above may further include processes, features, means, or instructions for identifying the length of downlink symbols used to transmit the PDSCH based at least in part on a bit value in a DCI field received in the DCI where a demodulation reference signal (DMRS) pattern is associated with the bit value in the DCI field.

Some examples of the method, apparatus, and non-transitory computer-readable medium described above may further include processes, features, means, or instructions for receiving control information in a master information block (MIB) on a physical broadcast channel (PBCH) from the base station. Some examples of the method, apparatus, and non-transitory computer-readable medium described above may further include processes, features, means, or instructions for determining the starting downlink symbol index of the PDSCH based at least in part on the control information in the MIB. Some examples of the method, apparatus, and non-transitory computer-readable medium described above may further include processes, features, means, or instructions for determining the ending downlink symbol index of the PDSCH based at least in part on receiving control information in a DCI on a physical downlink control channel (PDCCH) from the base station, wherein decoding the PDSCH may be based at least in part on the starting downlink symbol index and the ending downlink symbol index.

In some examples of the method, apparatus, and non-transitory computer-readable medium described above, the indication of the length of downlink symbols used to transmit the PDSCH may be received before a RRC configuration procedure between the UE and the base station.

A method of wireless communications is described. The method may include identifying a length of downlink symbols used to transmit a PDSCH that carries broadcast information to a UE while the UE is outside of a RRC connected state, the length being from a starting downlink symbol index to an ending downlink symbol index, and transmitting the indication to the UE.

An apparatus for wireless communications is described. The apparatus may include means for identifying a length of downlink symbols used to transmit a PDSCH that carries broadcast information to a UE while the UE is outside of a RRC connected state, the length being from a starting downlink symbol index to an ending downlink symbol index, and means for transmitting the indication to the UE.

Another apparatus for wireless communications is described. The apparatus may include a processor, memory in electronic communication with the processor, and instructions stored in the memory. The instructions may be operable to cause the processor to identify a length of downlink symbols used to transmit a PDSCH that carries broadcast information to a UE while the UE is outside of a RRC connected state, the length being from a starting downlink symbol index to an ending downlink symbol index, and transmit the indication to the UE.

A non-transitory computer-readable medium for wireless communications is described. The non-transitory computer-readable medium may include instructions operable to cause a processor to identify a length of downlink symbols used to transmit a PDSCH that carries broadcast information to a UE while the UE is outside of a RRC connected state, the length being from a starting downlink symbol index to an ending downlink symbol index, and transmit the indication to the UE.

In some examples of the method, apparatus, and non-transitory computer-readable medium described above, the broadcast information comprises RMSI or OSI, or both. Some examples of the method, apparatus, and non-transitory computer-readable medium described above may further include processes, features, means, or instructions for providing, to the UE, an indication of the starting downlink symbol index based at least in part on transmitting control information in a MIB on a PBCH.

Some examples of the method, apparatus, and non-transitory computer-readable medium described above may further include processes, features, means, or instructions for assigning a set of downlink symbols for transmission of the PDSCH carrying the broadcast information based at least in part on a preconfigured rule. Some examples of the method, apparatus, and non-transitory computer-readable medium described above may further include processes, features, means, or instructions for scheduling the PDSCH based at least in part on the assigned set of downlink symbols.

In some examples of the method, apparatus, and non-transitory computer-readable medium described above, the assigned set of downlink symbols may be variable based at least in part on the PDSCH carrying RMSI or OSI. Some examples of the method, apparatus, and non-transitory computer-readable medium described above may further include processes, features, means, or instructions for identifying a plurality of downlink symbols associated with slot of a frame. Some examples of the method, apparatus, and non-transitory computer-readable medium described above may further include processes, features, means, or instructions for determining that the identified plurality of downlink symbols satisfy the assigned set of downlink symbols, wherein scheduling the PDSCH may be based at least in part on the identified plurality of downlink symbols associated with the slot satisfying the assigned set of plurality of downlink symbols used to transmit the PDSCH.

Some examples of the method, apparatus, and non-transitory computer-readable medium described above may further include processes, features, means, or instructions for determining that the identified plurality of downlink symbols may be below the assigned set of downlink symbols. Some examples of the method, apparatus, and non-transitory computer-readable medium described above may further include processes, features, means, or instructions for refraining from scheduling the PDSCH during the slot.

Some examples of the method, apparatus, and non-transitory computer-readable medium described above may further include processes, features, means, or instructions for determining that the identified plurality of downlink symbols may be above the assigned set of downlink symbols. Some examples of the method, apparatus, and non-transitory computer-readable medium described above may further include processes, features, means, or instructions for truncating a set of unused downlink symbols associated with the slot, wherein scheduling the PDSCH may be based at least in part on the truncating.

Some examples of the method, apparatus, and non-transitory computer-readable medium described above may further include processes, features, means, or instructions for puncturing the set of unused downlink symbols associated with the slot. Some examples of the method, apparatus, and non-transitory computer-readable medium described above may further include processes, features, means, or instructions for determining a minimum set of downlink symbols for transmission of the PDSCH carrying the broadcast information. Some examples of the method, apparatus, and non-transitory computer-readable medium described above may further include processes, features, means, or instructions for determining a maximum set of downlink symbols for transmission of the PDSCH carrying the broadcast information.

Some examples of the method, apparatus, and non-transitory computer-readable medium described above may further include processes, features, means, or instructions for transmitting the indication of the length of downlink symbols in a DCI on a PDCCH. Some examples of the method, apparatus, and non-transitory computer-readable medium described above may further include processes, features, means, or instructions for determining the length of downlink symbols used to transmit the PDSCH carrying broadcast information based at least in part on a preconfigured rule. Some examples of the method, apparatus, and non-transitory computer-readable medium described above may further include processes, features, means, or instructions for assigning a bit value associated with a DCI field of the DCI, the bit value indicating the length of downlink symbols.

BRIEF DESCRIPTION OF THE DRAWINGS

FIGS. 3A through 3H illustrate example configurations that support rate matching for broadcast channels in accordance with aspects of the present disclosure.

DETAILED DESCRIPTION

Figure 1:
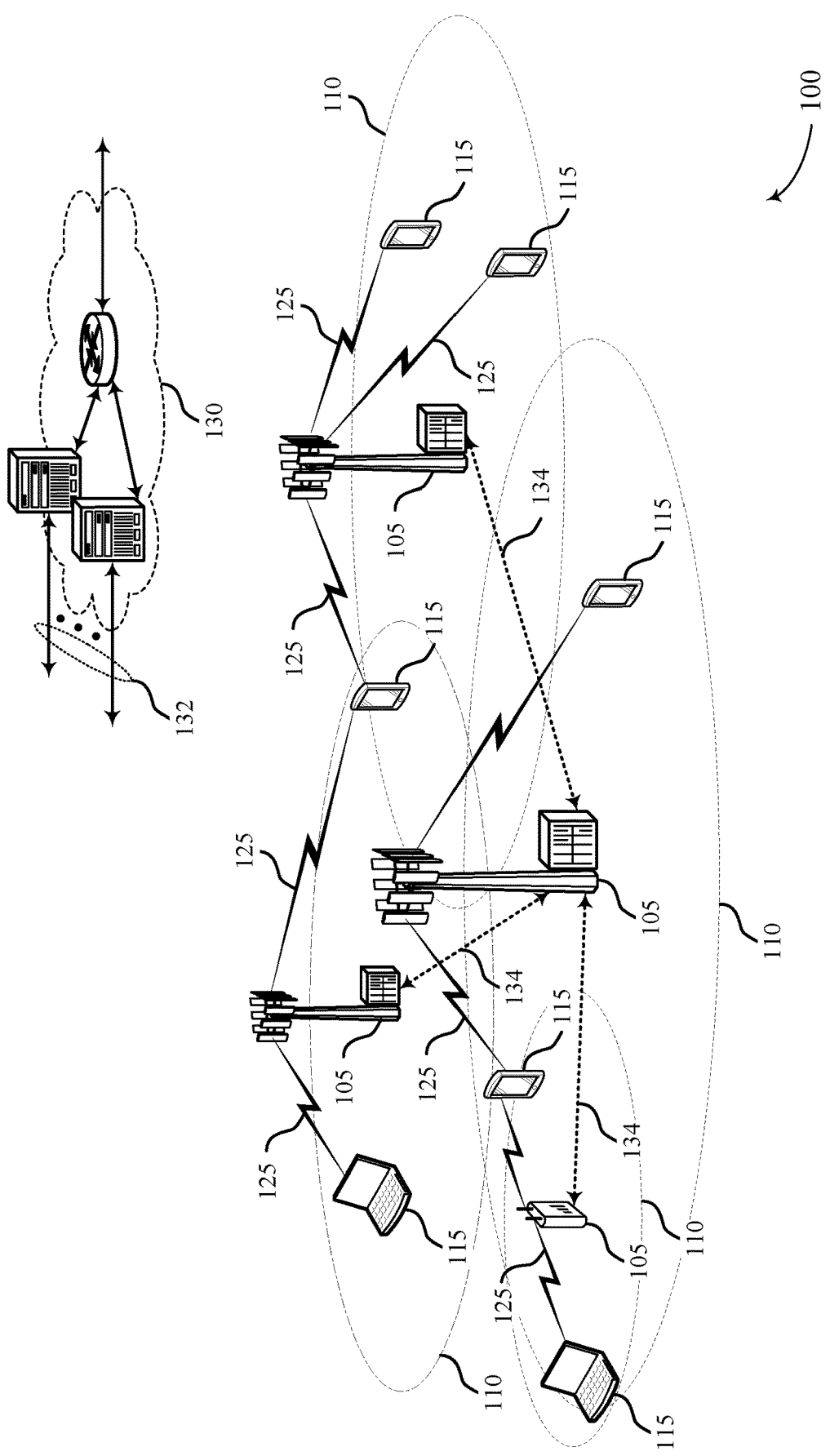
FIG. 1 illustrates an example of a system for wireless communications that supports rate matching for broadcast channels in accordance with aspects of the present disclosure.

In some wireless communications systems (e.g., millimeter wave (mmW) New Radio (NR) systems), wireless devices (e.g., a base station and a user equipment (UE)) may utilize directional or beamformed transmissions (e.g., beams) to communicate with each other. A base station may perform a radio resource control (RRC) connection procedure, including a beam sweep procedure, to allow the base station and a UE to identify appropriate beams for mmW communications. In such cases, the UE may also receive broadcast system information from the base station, which the UE may use to access a wireless network (e.g., through the base station). The UE may identify timing information from received synchronization signals from the base station to synchronize with the base station. In addition to the synchronization signals, the UE may also receive system information from the base station, which the UE may use to access a wireless network (e.g., through the base station).

The UE may also receive via a broadcast channel (e.g., physical downlink shared channel (PDSCH)) additional broadcast information (e.g., remaining minimum system information (RMSI) and other system information (OSI)) that may include additional parameters to allow the UE to communicate with the base station. In such cases, however, reception of the additional broadcast information may be challenging for the UE because the UE may be unaware of the appropriate resources (e.g., symbols, resource elements, etc.) to monitor to receive the additional broadcast information from the base station. That is, the base station may not provide the additional broadcast information to the UE while the UE is outside of an RRC connected state. The present disclosure may support efficient techniques for indicating to a UE a length from a starting downlink symbol to an ending downlink symbol (i.e., a number of downlink symbols from a starting downlink symbol index to an ending downlink symbol index (or, alternatively, coordinates)) for a PDSCH. The UE may receive an indication of the length from the base station, and as such monitor and decode the PDSCH carrying the additional broadcast information, for example, over the number of downlink symbols. For example, a UE may receive, from a base station, a PDSCH over a plurality of downlink symbols and, while being outside of an RRC connected state, perform a blind decoding of the PDSCH over a first set of the plurality of downlink symbols. The UE may then determine whether the blind decoding was successful. If the decoding was successful, the UE may continue to process the broadcast information (e.g., RMSI, OSI). However, if the UE determines that the blind decoding was unsuccessful, the UE may wait for the base station to retransmit the PDSCH and repeat the blind decoding. In some cases, the UE may perform the blind decoding of the retransmitted PDSCH over a second set of the plurality of downlink symbols. In this case, the second set may be different in length than the first set, for example, to improve the capability of the UE to perform a successful decoding of the PDSCH.

Aspects of the disclosure are initially described in the context of a wireless communications system. Exemplary UEs and base stations (e.g., next generation NodeBs (gNBs), evolved NodeBs (eNBs)), systems, and process flow that support rate matching for broadcast channels. Aspects of the disclosure are further illustrated by and described with reference to apparatus diagrams, system diagrams, and flowcharts that relate to beam misalignment detection.

FIG. 1 illustrates an example of a system 100 for wireless communications that supports rate matching for broadcast channels in accordance with aspects of the present disclosure. The system 100 may include base stations 105, UEs 115, and a core network 130. In some examples, the system 100 may be a Long Term Evolution (LTE) network, an LTE-Advanced (LTE-A) network, or a New Radio (NR) network. In some cases, system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. A base station 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell ID (PCID) or a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

System 100 may operate in an extremely high frequency (EHF) region of the spectrum (e.g., from 30 GHz to 300 GHz), also known as the millimeter band. In some examples, the system 100 may support mmW communications between UEs 115 and base stations 105, and EHF antennas of the respective devices may be even smaller and more closely spaced than ultra-high frequency (UHF) antennas. In some cases, this may facilitate use of antenna arrays within a UE 115. However, the propagation of EHF transmissions may be subject to even greater atmospheric attenuation and shorter range than super high frequency (SHF) or UHF transmissions. Techniques disclosed herein may be employed across transmissions that use one or more different frequency regions, and designated use of bands across these frequency regions may differ by country or regulating body.

A base station 105 may perform an RRC connection procedure including a beam sweep procedure to allow the base station 105 and a UE 115 to identify appropriate beams for mmW communications. During the RRC connection procedure, the UE 115 may also receive system information from the base station 105, which the UE 115 may use to access a wireless network (e.g., through the base station 105). The UE 115 may also receive timing information to synchronize with the base station 105. Synchronization (e.g., for cell acquisition) may be performed using synchronization signals or channels transmitted by a synchronization source (e.g., the base station 105). A base station 105 may transmit synchronization signals including discovery reference signals. Synchronization signals may include primary synchronization signals (PSSs) or secondary synchronization signals (SSSs). A UE 115 attempting to access a wireless network may perform an initial cell search by detecting a PSS from the base station 105. The PSS may enable synchronization of slot timing and may indicate a physical layer identity value. The UE 115 may then receive an SSS.

The SSS may enable radio frame synchronization, and may provide a cell ID value, which may be combined with the physical layer identity value to form the PCID, which identifies the cell. The SSS may also enable detection of a duplexing mode (e.g., time-division duplexing (TDD) or frequency-division duplexing (FDD)). An SSS may be used to acquire other broadcast information (e.g., system bandwidth). In some cases, the base station 105 may provide the other broadcast information for the UE 115 in the physical broadcast channel (PBCH). As such, the PBCH may be used to acquire additional broadcast information needed for acquisition (e.g., system bandwidth, radio frame index/number).

The PBCH may carry a master information block (MIB) for a given cell. However, in some cases the base station 105 may be unable to provide the additional broadcast information to the UE 115 using the MIB. Instead, the base station 105 may provide additional broadcast information (e.g., RMSI and OSI) via a different physical broadcast channel, that may include additional parameters to allow the UE 115 to communicate with the base station 105. For example, the base station 105 may transmit RMSI and OSI to the UE 115 on a PDSCH. In such cases, however, reception of the additional broadcast information may be challenging for the UE 115 because if the UE is outside an RRC connected state, the UE 115 may be unaware of the appropriate resources (e.g., symbols, resource elements, etc.) to monitor to receive the PDSCH carrying the additional broadcast information from the base station 105.

In some examples, the physical broadcast channels may be multiplexed on a carrier according to various techniques. A physical broadcast control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical broadcast channel may be distributed between different control regions in a cascaded manner (e.g., between a common control region or common search space and one or more UE-specific control regions or UE-specific search spaces).

Returning to the previous example, in the case that the base station 105 may transmit some system information in the PBCH and other additional broadcast information (e.g., RMSI, OSI) in a different broadcast channel (e.g., PDSCH), the UE 115 may have challenges receiving and identifying the other additional broadcast information. For example, the PDSCH may be mapped to a wide range of time and frequency resources, and it may be challenging for the UE 115 to identify a length (e.g., from a starting downlink symbol index to an ending downlink symbol index) of the PDSCH within a slot or a subframe within a frame, such that the UE 115 may receive and decode the PDSCH accordingly. The base station 105 of system 100 may support efficient techniques for providing an indication to the UE 115 of the length of the PDSCH within a slot or a subframe, which the UE 115 may receive and decode the PDSCH carrying the additional broadcast information. The PDSCH may be duplexed via, for example, TDD and/or FDD.

A base station 105 may identify a length of downlink symbols used to transmit a PDSCH that carries broadcast information to the UE 115, while the UE 115 is outside of an RRC connected state, and the base station 105 may transmit the indication to the UE 115. As used herein, the length may be a fixed length of a number of downlink symbols. In other words, the length of downlink symbols may refer to a length of the PDSCH as measured in number of downlink symbols. In some cases, the base station 105 may provide to the UE 115 an indication of the starting downlink symbol index based on transmitting control information in a MIB on a PBCH. The base station 105 may also transmit the indication of the length of downlink symbols in a downlink control information (DCI) on a physical downlink control channel (PDCCH).

The UE 115 may receive, from the base station 105, the PDSCH over a plurality of downlink symbols and while being outside of an RRC connected state. In some cases, the UE 115 may perform blind decoding of the PDSCH over a first set of the plurality of downlink symbols. Once the UE 115 completes the blind decoding, the UE 115 may determine whether the decoded PDSCH was successful or unsuccessful. In some cases, the UE 115 may perform a second blind decoding of the PDSCH during a second set of the plurality of downlink symbols based on the determination. The second set may be different in length from the first set. In addition, the second set may be same as the first set. As a result, the UE 115 may perform blind decoding on the same set of downlink symbols. In some cases, the UE 115 may determine whether the decoded PDSCH was successful or unsuccessful based on a bit error or a code block cyclic redundancy check (CRC) procedure associated with codewords or packets (e.g., associated with the broadcast information (RMSI, OSI)) carried on the PDSCH.

In some cases, the base station 105 may assign a set of downlink symbols for transmission of the PDSCH carrying the broadcast information based on a preconfigured rule, and the base station 105 may schedule the PDSCH based on the assigned set of downlink symbols. The base station 105 may also determine the length of downlink symbols used to transmit the PDSCH carrying broadcast information based on the preconfigured rule and assign a bit value associated with a DCI field in a DCI. The bit value may indicate the length of downlink symbols. In some cases, the assigned set of downlink symbols may be variable based on the PDSCH carrying RMSI or OSI. For example, a PDSCH carrying RMSI may have a longer length of downlink symbols compared to a PDSCH carrying OSI, or vice versa. The base station 105 may determine a minimum or a maximum, or both, set of downlink symbols for transmission of the PDSCH carrying the broadcast information. The base station 105 may use the minimum or the maximum, or both, set of downlink symbols for transmission to assign the set of downlink symbols for the transmission of the PDSCH.

The UE 115 may select the first set of the plurality of downlink symbols or the second set of the plurality of downlink based on a preconfigured rule. The preconfigured rule may include or indicate a minimum number of downlink symbols or a maximum number of downlink symbols of the plurality of downlink symbols. In some cases, the minimum number of downlink symbols or the maximum number of downlink symbols, or both, may be indicated in a DCI transmitted from the base station 105. In some cases, the UE 115 may identify the length of downlink symbols used to transmit the PDSCH based on a field received in the DCI. For example, in some cases, the length of the downlink symbols may be indicated via a bit value in a field of a DCI. The UE 115 may also have an option to select more than two sets of lengths indicating a number of downlink symbols as described herein.

For example, the base station 105 (e.g., gNB) may be aware of a length of downlink symbols of the PDSCH. Based on knowing the length of downlink symbols, the base station 105 may quantize the length to a number of sets of downlink symbols. Upon quantizing the length, the base station 105 may select a set of downlink symbols and indicate the selection in a DCI field. For example, a first set may include ten to twelve downlink symbols (e.g., S0-S9, S0-S10, or S0-S11) for the PDSCH and a second set may include thirteen or fourteen downlink symbols (e.g., S0-S12 or S0-S13). In this case, the base station 105 may indicate the first set or the second set using at least one bit value. For example, the base station 105 may set a bit value to "1" in a DCI field to indicate the first set (e.g., S0-S9, S0-S10, or S0-S11, or any combination thereof), or set the bit value to "0" in the DCI field to indicate the second set (e.g., S0-S12 or S0-S13, or both). In some examples, a demodulation reference signal (DMRS) pattern may be associated with the bit value in the DCI field. That is, a DMRS pattern may also change as a function of that bit value.

The UE 115 may receive the field in a DCI transmitted from the base station 105 and identify which set the base station 105 selected. As such, the UE 115 may perform blind decoding for a length of downlink symbols indicated by the set in the field of the DCI. Alternatively, the base station 105 may refrain from quantizing the length of downlink symbols associated with the PDSCH. For example, the base station 105 may select a single set of downlink symbols, which may be a full set from a minimum number of downlink symbols to a maximum number of downlink symbols. In this case, the base station 105 may not have to indicate the full set in a field of a DCI (e.g., no bit is needed in a DCI field). The UE 115 may still perform blind decoding of the PDSCH. In some cases, the base station 105 may quantize the length of downlink symbols of the PDSCH such that each downlink symbols is a set (i.e., each set is one downlink symbol). In this case, the base station 105 may include more than one bit in a field of a DCI to indicate the different possible sets. This may be beneficial because when the UE 115 receives the DCI from the base station 105, the UE 115 will identify and know the exact length of the PDSCH. As a result, the UE 115 will avoid having to perform blind decoding of the PDSCH.

In some cases, the base station 105 may identify a plurality of downlink symbols associated with a slot of a frame and determine that the identified plurality of downlink symbols satisfy (i.e., a are equal to) the assigned set of downlink symbols. As a result, the base station 105 may schedule the PDSCH based on the identified plurality of downlink symbols associated with the slot satisfying the assigned set of plurality of downlink symbols used to transmit the PDSCH. Alternatively, the base station 105 may determine that the identified plurality of downlink symbols is below the assigned set of downlink symbols, and refrain from scheduling the PDSCH during the slot. In some examples, the base station 105 may determine that the identified plurality of downlink symbols is above the assigned set of downlink symbols and truncate a set of unused downlink symbols associated with the slot. In this case, the base station 105 may schedule the PDSCH based on the truncating. The base station 105 may also puncture the set of unused downlink symbols associated with the slot to rate match the PDSCH onto the number of available downlink symbols.

The base station 105 may rate match coded bits of the PDSCH into available downlink symbols. For example, after the base station 105 selects a set (e.g., first set (S9-S11) or second set (S9-S13)), the coded bits of the PDSCH may be rate matched to the maximum number of downlink symbols in the set and then punctured. In this case, the rate matching assumes the maximum number of downlink symbols in the selected set to be available, however, the base station 105 transmits only the actual number of available downlink symbols for the PDSCH. For example, if a bit value of a DCI field is set to zero to indicate a selected set, the base station 105 may estimate that an ending downlink symbol is symbol fourteen in a slot (S13) to perform the rate matching. However, the slot may only have twelve downlink symbols (S0-S11). The remaining downlink symbols (S12 and S13) will not be transmitted by the base station 105. Alternatively, if the bit value of the DCI field is set to one to indicate a selected set (e.g., S0-S9, S0-S10, or S0-S11), the base station 105 may estimate that an ending downlink symbol is symbol twelve (S11) in a slot to perform the rate matching. However, the slot may only have ten downlink symbols, as such the ending downlink symbol would be S09 and not S11. In this case, the remaining downlink symbols (S10 and S11) will be punctured and not transmitted by the base station 105.

The UE 115 may perform blind decoding based on assuming different lengths of downlink symbols of the PDSCH transmitted from the base station 105. In some cases, the UE 115 may determine a failure to successfully decode the PDSCH transmitted from the base station 105. In this case, the UE 115 may wait for the base station 105 to retransmit a PDSCH. The UE 115 may receive a retransmission of the PDSCH from the base station 105 and perform blind decoding on all possible different lengths of downlink symbols of the PDSCH. In some cases, the UE 115 may receive a retransmission of the PDSCH from the base station 105, and select a same or different set (e.g., second set of the plurality of downlink symbols) based on the retransmission of the PDSCH. The UE 115 may perform a blind decoding of the PDSCH associated with the retransmission over the selected second set of the plurality of downlink symbols.

By indicating to the UE 115, a length (e.g., a number of downlink symbols from a starting downlink symbol to an ending downlink symbol) for the PDSCH, the UE 115 may receive and decode the PDSCH carrying the additional broadcast information, while outside of RRC connected state. As a result, this may reduce latency in the system 100.

Figure 2:
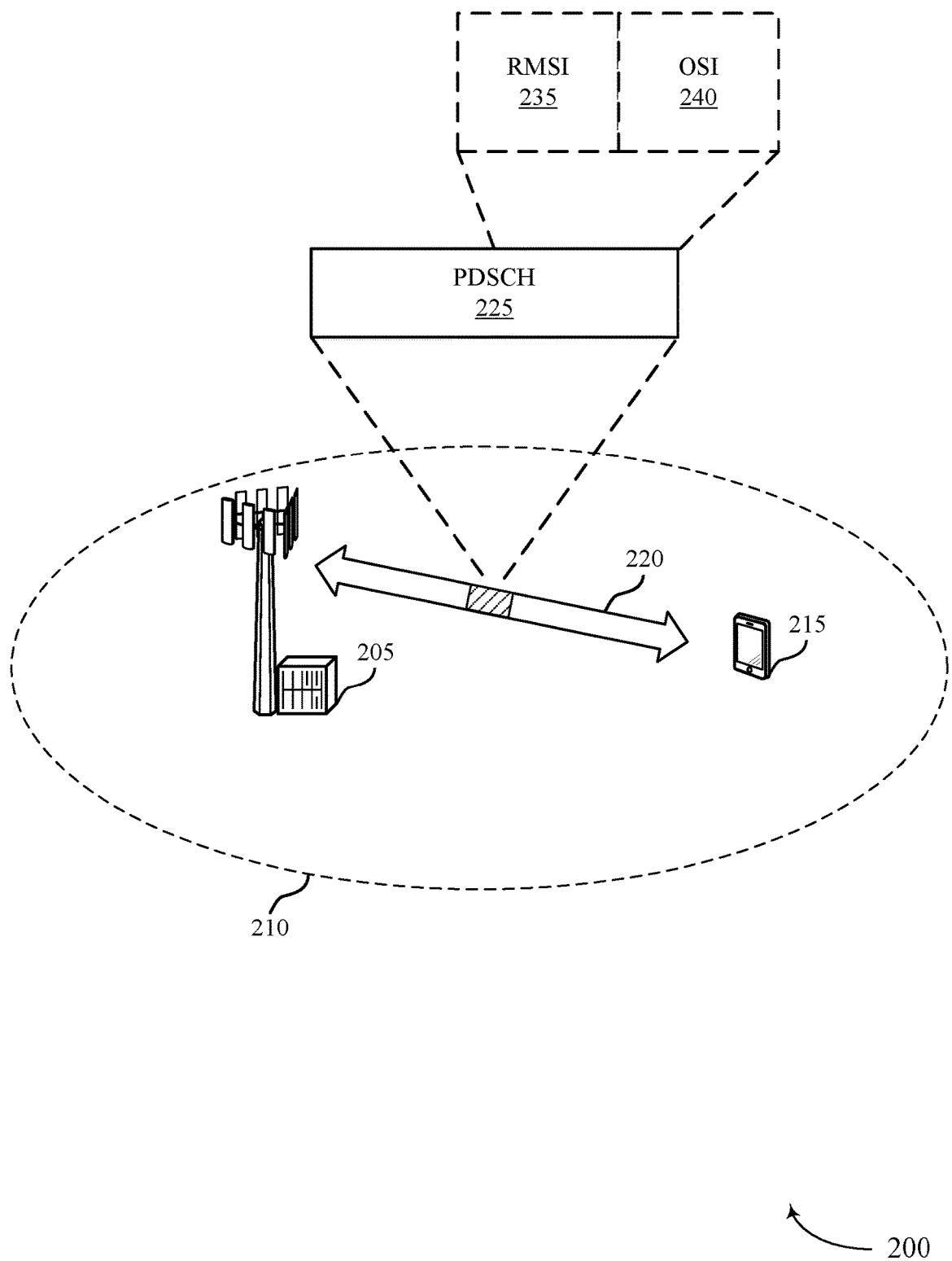
FIG. 2 illustrates an example of a system for wireless communications that supports rate matching for broadcast channels in accordance with aspects of the present disclosure.
Figure 3A:
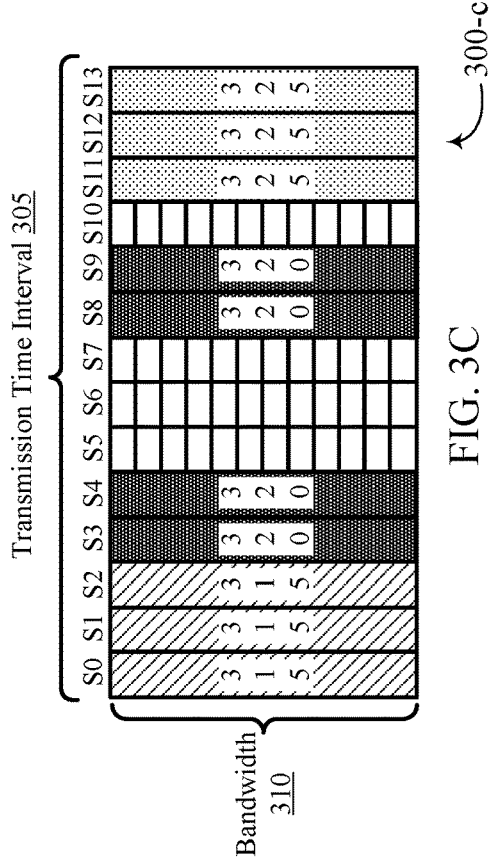
Figure 3B:
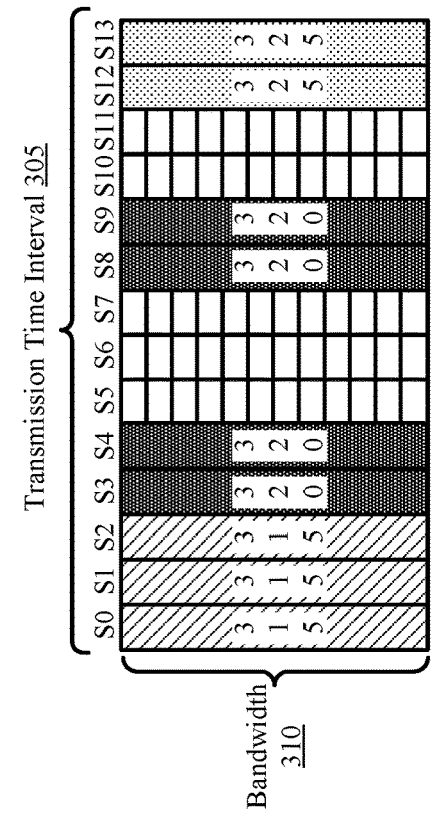
Figure 3C:
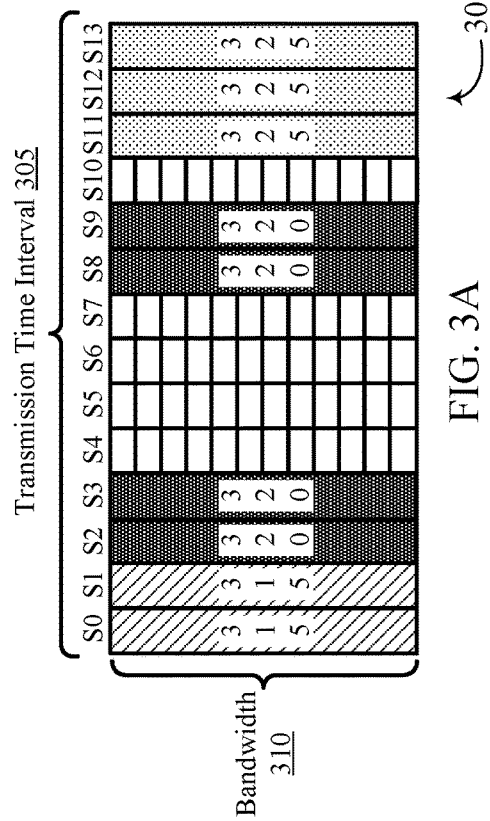
Figure 3D:
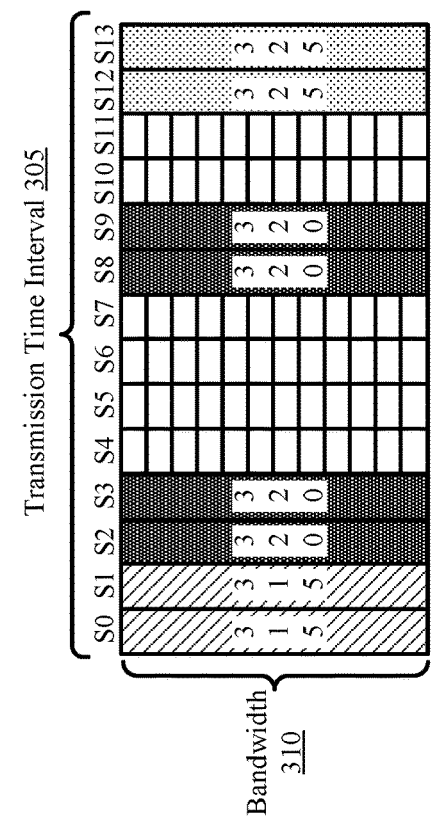

FIG. 2 illustrates an example of a system 200 for wireless communications that supports rate matching for broadcast channels in accordance with various aspects of the present disclosure. In some examples, system 200 may implement aspects of system 100. Some examples of system 200 may be a mmW wireless communications system. System 200 may include a base station 205 and a UE 215, which may be examples of the corresponding devices described with reference to FIG. 1. System 200 may also operate according to a radio access technology (RAT) such as a 5G New Radio (NR) RAT, although techniques described herein may be applied to any RAT and to systems that may concurrently use two or more different RATs. In some cases, system 200 may support rate matching for broadcast channels and operate according to 5G NR RAT.

The base station 205 may establish a connection (e.g., a bidirectional link 220) with the UE 215 and allocate resources for transmission to the UE 215. The resources may be allocated by the base station 205 during an RRC procedure (e.g., a cell acquisition procedure, random access procedure, RRC connection procedure, and/or RRC configuration procedure). The base station 205 may configure the UE 215 to monitor control resource sets (e.g., coresets) for DCI via downlink transmissions (e.g., downlink mmW beam transmissions via the bidirectional link 220). The DCI may include downlink grants, uplink grants, uplink power control commands, and other control information. The base station 205 may transmit the DCI to the UE 215 on a broadcast channel. For example, the base station 205 may transmit DCI to the UE 215 during a random access channel (RACH) procedure on a PDCCH. In addition, using scheduling commands and scheduling grants, the base station 205 may inform the UE 215 of forthcoming transmissions on another broadcast channel (e.g., PDSCH 225) or grant the UE 215 resources for transmissions on an uplink channel (e.g., physical uplink shared channel (PUSCH)), or both.

The transmission of user data between the UE 215 and the base station 205 may depend on the successful decoding of DCI sent by the base station 205 to the UE 215 via bidirectional link 220 using the designated coresets. This DCI may enable the UE 215 to successfully receive, demodulate, and decode wireless transmissions by the base station 205. In addition, the UE 215 may perform rate matching for a channel (e.g., PDSCH). In some examples, however, a PDSCH 225 may be mapped to a wide range of time and frequency resources, and it may be challenging for the UE 215 to identify one or more positions (e.g., symbol indexes or frame indexes) of the PDSCH 225 such that the UE 215 may determine a length (e.g., a number of symbols from a starting downlink symbol index to an ending downlink symbol index) of the PDSCH 255 and decode the PDSCH 225 carrying the RMSI 235 or the OSI 240, or both. In some examples, the RMSI 235 or the OSI 240 may span an entire length of the PDSCH 225 or a portion of the PDSCH 225. Additionally, the RMSI 235 or the OSI 240 may be optional. According to the principles of this disclosure, the base station 205 may provide the UE 215 with an indication of a length of the PDSCH 225, for example, a number of downlink symbols from a start symbol index to an end symbol index such that the UE 215 may decode and receive the RMSI 235 or the OSI 240, or both, from the base station 205.

An example frame structure in NR systems may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\,T_s$. Each frame may include 10 subframes numbered from 0 to 9, and each subframe may have a duration of 1 ms. A subframe may be further divided into 2 slots each having a duration of 0.5 ms, and each slot may contain 14 modulation symbol periods (e.g., orthogonal frequency-division multiplexing (OFDM) symbols). In some cases, a subframe may be the smallest scheduling unit of the system 200 and may be referred to as a transmission time interval (TTI). In other cases, a smallest scheduling unit of the system 200 may be shorter than a subframe or may be dynamically selected (e.g., in bursts of shortened TTIs (sTTIs) or in selected component carriers using sTTIs).

The UE 215 may be preconfigured with a starting symbol index indicating a starting point for transmission of a broadcast channel. For example, the UE 215 may be preconfigured with a starting symbol index, for example, a third symbol (S2), or a fourth symbol (S3) of a slot, indicating that the PDSCH 225 may occur during or begin at the third symbol (S2) or the fourth symbol (S3) of a slot. The UE 215 may also infer or determine the starting symbol index for a starting point for transmission of the PDSCH 225 based on control information received from the base station 205, during a RACH procedure. For example, the base station 205 may transmit some control information to the UE 215 in a MIB via PBCH during the RACH procedure. The MIB may include a flag or field that may indicate to the UE 215 an initial DMRS location (e.g., a starting symbol) in a slot. This information provided in the MIB may indicate to the UE 215 that the base station 205 can support control resource elements (i.e., coresets) up to two or three symbols in length. That is, the UE 215 may infer or determine that the base station 205 may provide the coresets to the UE 215 via PDCCH during a first and second symbol (e.g., symbols S0 and S1) or during a first, second, and a third symbol (e.g., symbols S0 through S2) of a slot based on the location of the initial DMRS. In addition to knowing the symbol indices associated with the coreset transmission on the PDCCH, the UE 215 may also infer or determine, from the coreset transmission symbol indices, a starting symbol index indicating a starting point for transmission of the PDSCH 225 and forthcoming data transmission. For example, in the case that the coreset spans a length of three symbols in a slot, the UE 215 may infer or determine that a starting point of the PDSCH 225 carrying broadcast information (e.g., RMSI, OSI, or both) may occur at a fourth symbol (e.g., S3).

The starting symbol index for a broadcast channel transmission may also be configured based on a duplexing mode (e.g., TDD or FDD). For example, the PDSCH 225 may span a number of time or frequency resources based on the duplexing mode. In this case, the UE 215 may infer or determine a starting symbol index of the PDSCH 225 for TDD or a resource element index (e.g., a subcarrier index and symbol index) of the PDSCH 225 for FDD.

The UE 215 may also be preconfigured with an ending symbol index indicating an ending point for transmission of the PDSCH 225. The base station 205 may support a configuration for a single transmission. For example, the base station 205 may support a unicast PDSCH transmission. The base station 205 may also support broadcasting a number of different transmissions (e.g., unicast and multicast). For example, the base station 205 may support a downlink transmission only, a downlink-centric transmission, an uplink-centric transmission, among others. As such, the base station 205 may have a list or a set of predetermined ending symbol indices based on the number of different transmission types. This may result in a length of the field in the DCI for a multicast transmission being longer compared to a unicast transmission. In some cases, the base station 205 may select and aggregate a subset of predetermined ending symbols to reduce a length of a field in a control message (e.g., DCI). For example, in the unicast case the base station 205 may use a single bit in a DCI field to indicate to the UE 215 one of the two predetermined ending symbol indices for a PDSCH.

In the multicast case, however, the base station 205 may aggregate a subset of predetermined ending symbols to provide a dynamic indication of an ending symbol index to the UE 215. For example, the base station 205 may select to support a downlink-only transmission (e.g., all 14 downlink symbols of a slot), a downlink-centric transmission (e.g., 12 downlink symbols, one gap symbol, and one uplink symbol), or an uplink-centric transmission. In this example, the base station 205 may indicate the supported transmission by setting a bit value of a DCI field in a DCI. For example, setting a bit value to "1" may correspond to the downlink-only transmission and the downlink-centric transmission. Additionally or alternatively, the base station 205 may designate a downlink-centric and an uplink-centric transmission, by setting the bit value of the DCI field to "0". This allows the base station 205 to reduce the length of the field in the DCI by dynamically indicating support for different transmissions. Alternatively, the base station 205 may use multiple bits to indicate to the UE 215 that the base station 205 supports different transmissions (e.g., in different slot, subframe, and frame formats) associated with the PDSCH 225.

The base station 205 may, in some examples, provide a slot format indicator (SFI) to the UE 215, which may indicate a slot format being used by the base station 205. For example, the base station 205 may transmit the SFI to the UE 215 via a group common (GC) PDCCH (GC-PDCCH) that may indicate to the UE 215 that a slot format used by the base station 205 is a downlink-only transmission, a downlink-centric transmission, etc. In some cases, transmission of the GC-PDCCH may not be guaranteed. For example, the base station 205 may refrain from transmitting the GC-PDCCH to the UE 215. In addition, the UE 215 may also not be configured to continuously monitor for the GC-PDCCH. As a result, the UE 215 may not rely on receiving the SFI to identify slot format used by the base station 205.

In some cases, the UE 215 may infer or determine an ending symbol index for the PDSCH 225 based on a set of predetermined ending symbol indices. For example, the UE 215 may receive a supported transmission indication via DCI from the base station 205. Using the supported transmission indication, the UE 215 may infer or determine one or more possible ending symbol indices associated with the PDSCH 225. For example, for a downlink-only transmission, the UE 215 may infer or determine that a possible ending symbol index may be a fourteenth symbol (S13) of a slot. In another example, for a downlink-centric transmission, the UE 215 may infer or determine that a possible ending symbol index for the PDSCH 225 transmission may be an eleventh symbol (S10) or a twelfth symbol (S11) of a slot, because the downlink-centric transmission may indicate to the UE 215 that the thirteenth and fourteenth symbol are used for gap or uplink transmission, or both. The base station 205 or the UE 215 may thus decode and rate match the PDSCH 225 to the number of symbols indicated in the DCI.

The base station 205 may, in some cases, provide a length (e.g., duration or period, or OFDM symbol span, from a starting downlink symbol index to an ending downlink symbol index) of the PDSCH 225 to the UE 215. That is, the base station 205 may explicitly provide a starting or an ending symbol index, or both, for the PDSCH 225 to the UE 215. In some examples, the base station 205 may provide a control message indicating the ending symbol index of the PDSCH 225 carrying additional broadcast information (i.e., RMSI 235, OSI 240) to the UE 215. For example, the base station 205 may provide the length of the PDSCH 225 in a field of a DCI. By having the base station 205 provide an indication of an ending symbol index of a broadcast channel to the UE 215, the DCI size may be greater (e.g., increase number of DCI bits) compared to existing dimensions of a DCI transmitted on a PDCCH.

The base station 205 may also be aware of a length of downlink symbols of the PDSCH. Based on knowing the length of downlink symbols, the base station 205 may quantize the length to a number of sets of downlink symbols. Upon quantizing the length, the base station 205 may select a set of downlink symbols and indicate the selection in a DCI field. For example, a first set may include ten to twelve downlink symbols (e.g., S0-S9 or S0-S10) for the PDSCH and a second set may include thirteen or fourteen downlink symbols (e.g., S0-S12 or S0-S13). In this case, the base station 205 may indicate the first set or the second set using at least one bit value. For example, the base station 205 may set a bit value to "1" in a DCI field to indicate the first set (e.g., S0-S9 or S0-S10), or set the bit value to "0" in the DCI field to indicate the second set (e.g., S0-S12 or S0-S13). In some examples, a DMRS pattern may be associated with the bit value in the DCI field. That is, a DMRS pattern may also change as a function of that bit value. For example, a DMRS pattern may be different for a bit value set to "1" compared to a bit value set to "0" in the DCI field.

FIGS. 3A through 3H illustrate example configurations 300-a through 300-h that support rate matching for broadcast channels in accordance with aspects of the present disclosure. In some cases, configurations 300-a through 300-h may support rate matching for broadcast channels during a scheduling unit in accordance with aspects of the present disclosure. In some cases, a scheduling unit may be a slot of a subframe or one or more symbol periods of a TTI. In some cases, one or more symbol periods may have different sizes (e.g., have different numerology, different subcarrier spacing (SCS)). Additionally, the number of symbol periods per scheduling unit may depend on which of an extended cyclic prefix or normal cyclic prefix is being used. In some cases, a TTI may refer to a slot that may include 14 symbols, or a mini-slot that may include a number of symbols, e.g., from one to 14 symbols. A TTI may also refer to an aggregated slot plus slot, or mini-slot plus mini-slot, slot plus mini-slot, or the like. In some examples, configurations 300-a through 300-h may implement aspects of systems 100 and 200.

Configurations 300-a through 300-h may include a TTI 305. The TTI 305 may include a number of symbol periods (e.g., S0 through S13). Configurations 300-a through 300-h may also include a bandwidth 310. The bandwidth 310 may include a number of subbands and component carrier or subcarriers within each subband. In some cases, configurations 300-a through 300-h, may include exchange of different information provided by the UE 215 or the base station 205, or both. For example, control information 325, DMRS 320, a PDSCH transmission on resource elements, and miscellaneous information (e.g., GAP, uplink transmission, or downlink channel state information reference signal (CSR-RS) transmission, etc.). The resource elements of configurations 300-a through 300-h may include PDSCH data symbols.

In some cases, the UE 215 may receive, based on configuration 300-a and 300-b, control information 315 during downlink symbols S0 and S1 during TTI 305. For example, the UE 215 may receive a field in a DCI transmitted from the base station 205, during downlink symbols S0 and S1, and identify a set of downlink symbols selected for transmission of a PDSCH based on a bit value in the field of the DCI. The UE 215 may also identify a DMRS pattern based on the bit value. The DMRS pattern may indicate transmission of DMRS 320 to the UE 215. In this case, the DMRS pattern includes DMRS transmission on downlink symbols S2-S3 and S8-S9 during TTI 305. Alternatively, based on configuration 300-c and 300-d, the DMRS pattern may indicate a different transmission of DMRS 320 to the UE 215. For instance, in this case the DMRS pattern includes DMRS transmission on downlink symbols S3-S4 and S8-S9 during TTI 305. Additionally, in the examples of configurations 300-a through 300-d, the UE 215 may identify that an ending downlink symbol may be one from ten to twelve downlink symbols (e.g., S9, S10, or S11).

In some cases, if the field of the DCI indicates a set of different possible ending downlink symbols of the PDSCH, the UE 215 may know the DMRS pattern and may perform channel estimation. However, ambiguity may still exist on the PDSCH ending downlink symbol (i.e., S9, S10, or S11). The UE 215 may therefore perform blind decoding on all possible ending downlink symbols (i.e., S9, S10, or S11), and may identify a true ending downlink symbol position of the PDSCH based on the blind decoding outcome. For example, based on the configuration 300-a or 300-c, the UE 215 may identify that the true ending downlink symbol for the PDSCH is S10. Alternatively, the UE 215 may identify a different ending downlink symbol position of the PDSCH based on the blind decoding. For example, based on configuration 300-b or 300-d, the UE 215 may identify that the ending downlink symbol for the PDSCH is S11 and not S10, as in the previous example.

In some cases, the UE 215 may receive, based on configurations 300-e and 300-f, control information 315 on downlink symbols S0 and S1 during TTI 305. For example, the UE 215 may receive a field in a DCI transmitted from the base station 205 on downlink symbols S0 and S1 and identify a set of downlink symbols selected for transmission of a PDSCH (i.e., by the base station 205) based on a bit value in the field of the DCI. The UE 215 may also identify a DMRS pattern based on the bit value. The DMRS pattern may indicate transmission of DMRS 320 to the UE 215. In these example configurations, the DMRS pattern may include DMRS transmission on downlink symbols S2-S3 and S10-S11. Alternatively, based on configuration 300-g and configuration 300-h, the DMRS pattern may indicate a different transmission of DMRS 320 to the UE 215. For instance, in these configurations the DMRS pattern may include DMRS transmission on downlink symbols S3-S4 and S10-S11. Additionally, in the examples of configurations 300-e through 300-h, the UE 215 may identify that an ending downlink symbol may be a thirteenth symbol (S12) or a fourteenth symbol 14 (S13) during TTI 305, based on the DMRS pattern and the indication of the set of downlink symbols.

The UE 215 may therefore perform blind decoding on all possible ending downlink symbols (i.e., S12 and S13), and may identify a true ending downlink symbol position of the PDSCH based on the blind decoding. For example, based on the configuration 300-e or 300-g, the UE 215 may identify that the true ending downlink symbol for the PDSCH is S12. Alternatively, the UE 215 may identify a different ending downlink symbol position of the PDSCH based on the blind decoding. For example, based on configuration 300-f or 300-h, the UE 215 may identify that the ending downlink symbol for the PDSCH is S13 and not S12, as in the previous example.

Returning to FIG. 2, the UE 215 may receive a field in a DCI transmitted from the base station 205 and identify which set the base station 205 has selected. As such, the UE 215 may perform blind decoding for a length of downlink symbols indicated by the set in the field of the DCI. Alternatively, the base station 205 may refrain from quantizing the length of downlink symbols associated with the PDSCH. For example, the base station 205 may select a single set of downlink symbols, which may be a full set (e.g., all downlink symbols of a slot) from a minimum number of downlink symbols to a maximum number of downlink symbols. In this case, the base station 205 may not indicate the full set in field of a DCI (e.g., no bit needed in a DCI field). The UE 215 may still perform blind decoding of the PDSCH.

In some cases, the base station 205 may quantize the length of downlink symbols of the PDSCH such that each downlink symbol is a set (i.e., each set is one downlink symbol). In this case, the base station 205 may include more than one bit in a field of a DCI to indicate the different possible sets. This may be beneficial because when the UE 215 receive the DCI from the base station 205, the UE 215 will identify and know the exact length of the PDSCH. As a result, the UE 215 will avoid having to perform blind decoding of the PDSCH.

The UE 215 may receive and decode a DCI. After decoding the DCI, the UE 215 may be aware of which symbols are used and may identify a starting symbol index or an ending symbol index, or both, for the PDSCH 225. For example, the UE 215 may detect the PDSCH 225 over a slot and identify a number of downlink OFDM symbols associated with the PDSCH 225. In some examples, a DCI field in the DCI may indicate a supported transmission (e.g., a downlink-only transmission, a downlink-centric transmission, etc.) and the UE 215 may identify a starting symbol or an ending symbol, or both, of the PDSCH 225. The UE 215 may perform rate matching for the broadcast channel in one or more available symbols. As a result, a minimum or no scheduling restriction related to slot selection for broadcast channel (i.e., the PDSCH 225) is applied for the base station 205. By increasing or extending a length of the DCI, the above described technique may provide improved decoding performance of the PDSCH 225 for the UE 215.

The base station 205 may rate match coded bits of the PDSCH into available downlink symbols. For example, after the base station 205 selects a set (e.g., a first set (S9-S11) or a second set (S9-S13)), the coded bits of the PDSCH may be rate matched to the maximum number of downlink symbols in the set and then punctured. In this case, the rate matching assumes the maximum number of downlink symbols in the selected set to be available, however, the base station 205 transmits only the actual number of available downlink symbols for transmitted the PDSCH. For example, if a bit value of a DCI field is set to zero to indicate a selected set, the base station 205 may estimate that an ending downlink symbol is symbol fourteen in a slot (S13) to perform the rate matching. However, the slot may only have twelve symbols (S0-S11). In this case, the remaining downlink symbols (S12 and S13) will not be transmitted by the base station 205. Alternatively, if the bit value of the DCI field is set to one to indicate a selected set (e.g., S0-S9, S0-S10, or S0-S11), the base station 205 may estimate that an ending downlink symbol is symbol twelve (S11) in a slot to perform the rate matching. However, the slot may only have ten downlink symbols, as such the ending downlink symbol would be S09 and not S11. In this case, the remaining downlink symbols (S11) will be punctured and not transmitted by the base station 205.

The base station 205 and the UE 215 may also provide efficient techniques for broadcast channel transmission and reception by supporting a fixed transmission length. A network operator associated with the base station 205 may, in some cases, assign a transmission configuration of the PDSCH 225. For example, the base station 205 may be configured with a slot format that may involve the base station 205 transmitting the PDSCH 225 carrying additional broadcast information (e.g., RMSI 235, OSI 240, or both) in a slot with a fixed number of downlink symbols (e.g., 12 downlink symbols). The UE 215 may be aware of the fixed transmission length based on being preconfigured with information indicating the fixed transmission length.

Alternatively, the base station 205 may assign the PDSCH 225 in a slot with a fixed number of downlink symbols based on a supported transmission configuration. For example, the base station 205 may assign a number of downlink symbols (e.g., n downlink symbols, where n is a positive integer) for the PDSCH 225. In some examples, the number of downlink symbols may vary based on the PDSCH 225 carrying the RMSI 235, the OSI 240, or both. For example, a PDSCH carrying RMSI may have more downlink symbols compared to a PDSCH carrying OSI.

In some examples, a remainder of symbols of a slot may not be used for the PDSCH 225 even given the availability of the symbols. In this case, the base station 205 may truncate a slot so that the base station 205 can transmit the PDSCH 225. This may also introduce scheduling restrictions that may involve the base station 205 refraining transmission of the PDSCH 225 for a slot having less downlink symbols than the selected number of downlink symbols for the PDSCH 225. In some cases, the base station 205 may assign and select a same or different number of downlink symbols to use for transmission of the additional broadcast information (e.g., RMSI 235, OSI 240, or both) based on a supported transmission configuration (e.g., a preconfigured rule). By supporting a fixed transmission length of the PDSCH 225, no ambiguity exists for the UE 215 to perform decoding (e.g., rate matching) of the PDSCH 225. Also, no additional DCI bits are introduced since the UE 215 and the base station 205 are preconfigured with information indicating the fixed transmission length of the PDSCH 225.

The base station 205 and the UE 215 may also support efficient techniques for receiving additional broadcast information (e.g., RMSI 235, OSI 240) by puncturing a slot associated with the PDSCH 225. The base station 205 may transmit the PDSCH 225 carrying the RMSI 235 or the OSI 240, or both, during a number of symbols of a slot. In some cases, the base station 205 may transmit the PDSCH 225 based on a transmission configuration (e.g., downlink-centric slot, downlink-only slot). The UE 215 may assume a fixed length for the PDSCH 225 based on the transmission configuration and decode the PDSCH 225. In some cases, where a slot does not include a number of expected symbols, the base station 205 may puncture symbols (e.g., gap and/or uplink symbols) that are not downlink symbols. In some cases, the transmission configuration may include a minimum number of downlink symbols or a maximum number of downlink symbols, or both, associated with the PDSCH 225. For example, a minimum number of downlink symbols may be 10 downlink symbols, and a maximum number of downlink symbols may be 14 downlink symbols (i.e., a size of an NR slot).

The UE 215 may be unaware of a number of symbols (e.g., a number of downlink OFDM symbols) to be used by the base station 205 for the PDSCH 225. In this case, the UE 215 may perform blind decoding based on a preconfigured rule (e.g., a set of conditions, hypothesis). A preconfigured rule may indicate a number of downlink symbols used by the base station 205 for the PDSCH 225. The preconfigured rule may include or indicate a set of downlink symbols associated with the PDSCH 225. For example, the set of downlink symbols may provide a set of options for example indicating that the PDSCH 225 may span: 10 downlink symbols in length, 11 downlink symbols in length, 12 downlink symbols in length, 13 downlink symbols in length, 14 downlink symbols in length, or any combination thereof.

The UE 215 may receive from the base station 205 the PDSCH 225 over a plurality of downlink symbols and while being outside of an RRC connected state. In some cases, the UE 215 may perform blind decoding of the PDSCH 225 over a first set of plurality of downlink symbols. Upon performing the blind decoding, the UE 215 may determine whether the blind decoding of the PDSCH 225 was successful or unsuccessful. For example, the UE 215 may determine a bit error or a code block CRC associated with codewords, transport blocks, or packets (e.g., including broadcast information (RMSI, OSI)) carried on the PDSCH 225. Based on the bit error or the CRC, the UE 215 may determine whether the blind decoding of the PDSCH 225 was successful or unsuccessful. In some cases, the UE 215 may perform a second blind decoding of the PDSCH 225 during a second set of the plurality of downlink symbols based on a previous failure of the blind decoding of the PDSCH 225. The second set may be different in length than the first set. For example, the UE 215 may assume that the length of the PDSCH 225 is 10 downlink symbols in length, after performing the blind decoding the UE 215 may assume a different length of the PDSCH 225, for example, 11 downlink symbols in length. As such, the UE 215 may repeat the blind decoding operation assuming a different set of downlink symbols until the UE 215 determines that the blind decoding of the PDSCH 225 was successful. The UE 215 may also repeat the blind decoding operation using all possible sets of downlink symbols indicated to the UE 215 via, for example, DCI, until the UE 215 determines that the blind decoding of the PDSCH 225 was successful.

A set of downlink symbol associated with the PDSCH 225 may be ranked. For example, the UE 215 may use a learning-algorithm to track and rank previous successfully blind decoding operations that resulted in a highest performance (e.g., little or no log-likelihood ratio (LLR)). The UE 215 may perform a soft combining of LLRs of coded bits of the PDSCH 225 based on coded bits of the PDSCH 225 being within the minimum number of downlink symbols. In some cases, if the UE 215 selects a set of downlink symbols where the length of downlink symbols is shorter than a set of downlink symbols of the PDSCH 225, some LLRs may not be used and there will be performance loss for the UE 215. Alternatively, if the UE 215 selects a set of downlink symbols where the length is longer than a set of downlink symbols of the PDSCH 225, some incorrect LLRs may be used for decoding and as a result there will be a bigger performance loss for the UE 215. The UE 215 may select a first set of the plurality of downlink symbols or a second set of the plurality of downlink based on a preconfigured rule. The preconfigured rule may include or indicate a minimum number of downlink symbols or a maximum number of downlink symbols of the plurality of downlink symbols. In some cases, the minimum number of downlink symbols or the maximum number of downlink symbols, or both, may be indicated in a DCI transmitted from the base station 205. In some cases, the UE 215 may identify the length of downlink symbols used to transmit the PDSCH based on a bit value in a DCI field received in the DCI.

The UE 215 may also perform soft combining for retransmissions. In some cases, the UE 215 may perform soft combining on LLRs where a selected set of downlink symbols is shorter than the downlink symbols of the PDSCH 225. For example, the UE 215 may perform a soft combining of a plurality of downlink symbols of the PDSCH associated with the first set of the plurality of downlink symbols and the second set of the plurality of downlink symbols based on the first set and the second set being equal or longer in length compared to length associated with a plurality of downlink symbols of the PDSCH transmitted from the base station.

In some examples, the base station 205 configure a plurality of different lengths (e.g., a set of different amounts of downlink symbols) for the PDSCH 225. For example, a network operator and administrator may assign a plurality of lengths of downlink symbols used for the PDSCH 225 and provide the plurality of lengths to the UE 215 or the base station 205 as a configuration during device startup (e.g., initialization). The base station 205 may indicate the plurality of different lengths using one or more DCI fields of a DCI, or a single DCI field using one or more bits to indicate different lengths of the PDSCH 225. The base station 205 may also configure the plurality of different maximum downlink symbol indices. Similarly, the base station 205 may indicate different maximum downlink symbol indices using at least one bit in a DCI field. For example, the base station 205 may set a bit value to "1" to indicate that downlink symbols 10 (S9) through 12 (S11) are associated with a maximum downlink symbol of the PDSCH 225. In another example, the base station 205 may set the bit value to "0" to indicate that downlink symbols 13 (S12) and 14 (S13) are associated with a maximum downlink symbol of the PDSCH 225. This may result in less number of bits usage for a DCI and the UE 215 performing less blind decoding. The RMSI 235 may be shorter and easier for the base station 205 to puncture, while the OSI 240 may be longer and indicating the length in the RMSI 235 may improve the performance and complexity by using accurate rate matching and combining.

By indicating to the UE 215, a length (e.g., a number of downlink symbols, starting downlink symbol and ending downlink symbol) for the PDSCH 225, the UE 215 may receive and decode the PDSCH 225 carrying the additional broadcast information, while outside of RRC connected state. As a result, this may reduce latency and provide better efficiency for the system 200.

Figure 4:
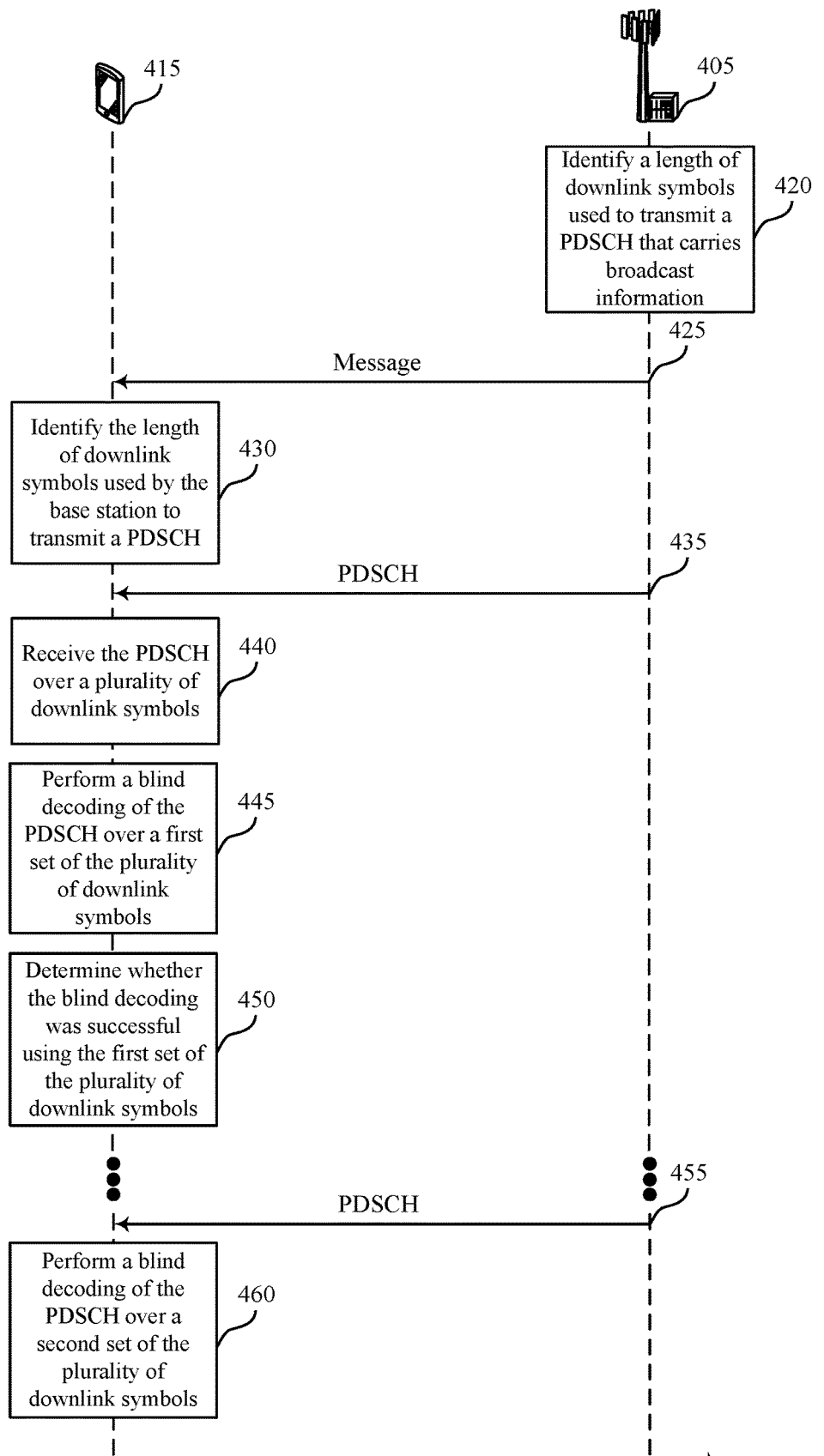
FIG. 4 illustrated an example process flow that supports rate matching for broadcast channels in accordance with aspects of the present disclosure.

FIG. 4 illustrates an example of a process flow 400 that supports rate matching for broadcast channel in accordance with aspects of the present disclosure. In some examples, process flow 400 may implement aspects of system 100 and 200. Base station 405 and UE 415 may be examples of the corresponding devices described with reference to FIGS. 1 and 2.

In the following description of the process flow 400, the operations between the base station 405 and UE 415 may be transmitted in a different order than the exemplary order shown, or the operations performed by base station 405 and UE 415 may be performed in different orders or at different times. Certain operations may also be left out of the process flow 400, or other operations may be added to the process flow 400. In some examples, process flow 400 may commence with base station 405 establishing a connection with UE 415. Base station 405 may provide radio resources to UE 415 for respective uplink communications. Additionally or alternatively, base station.

At 420, the base station 405 may identify a length of downlink symbols used to transmit a PDSCH that carries broadcast information to the UE 415. The broadcast information may include RMSI or OSI, or both. In some cases, the base station 405 may transmit the PDSCH to the UE 415, while the UE 415 is outside of an RRC connection state. The length of downlink symbols used to transmit the PDSCH may be a fixed length of downlink symbols. In some cases, the length may be from a starting downlink symbol index to an ending downlink symbol index. The base station 405 may be aware of a length of downlink symbols of the PDSCH. Based on knowing the length of downlink symbols, the base station 405 may quantize the length to a number of sets of downlink symbols. Upon quantizing the length, the base station 405 may select a set of downlink symbols and indicate the selection in a DCI field. For example, a first set may include ten to twelve downlink symbols (e.g., S0-S9 or S0-S10) for the PDSCH and a second set may include thirteen or fourteen downlink symbols (e.g., S0-S12 or S0-S13). In this case, the base station 405 may indicate the first set or the second set using at least one bit value. For example, the base station 405 may set a bit value to "1" in a DCI field to indicate the first set (e.g., S0-S9 or S0-S10), or set the bit value to "0" in the DCI field to indicate the second set (e.g., S0-S12 or S0-S13). In some cases, a DMRS pattern may also change as a function of that bit. Alternatively, the base station 405 may refrain from quantizing the length of downlink symbols associated with the PDSCH. For example, the base station 405 may select a single set of downlink symbols, which may be a full set (e.g., all downlink symbols of a slot) from a minimum number of downlink symbols to a maximum number of downlink symbols. In this case, the base station 405 may not have to indicate the full set in field of a DCI (e.g., no bit is needed in a DCI field). In some cases, the base station 405 may quantize the length of downlink symbols of the PDSCH such that each downlink symbol is a set (i.e., each set is one downlink symbol). In this case, the base station 405 may include more than one bit in a field of a DCI to indicate the different possible sets.

At 425, the base station 405 may transmit a message to the UE 415. The message may be an indication of the length of the downlink symbols used to transmit the PDSCH. In some cases, the message may be a DCI.

At 430, the UE 415 may identify the length of downlink symbols used by the base station 405 to transmit the PDSCH. For example, the UE 415 may receive a DCI and identify the length based on a DCI field and a bit value in the DCI field. Alternatively, the UE 415 may be preconfigured with a set of different lengths of downlink symbols used by the base station 405 to transmit the PDSCH. For example, a network operator and administrator may assign a set of lengths of downlink symbols used for PDSCH transmission and reception and provide the set of lengths to the UE 415 or the base station 405 as a configuration during device startup (e.g., initialization).

At 435, the base station 405 may transmit a PDSCH to the UE 415. The base station 405 may transmit the PDSCH using one or more beams (e.g., mmW beams) e.g., in a mmW wireless communications system. The base station 405 may also transmit the PDSCH in different groups of symbols (e.g., groups of 4 symbols) depending on the numerology of the resources used to transmit the PDSCH. For example, the base station 405 may transmit a PDSCH on a set of resources having a subcarrier spacing (e.g., 15 kHz). The resources used for the transmission of the PDSCH may also be within certain slots of certain subframes within a frame, and the PDSCH may span a number of resource blocks. In some cases, the base station 405 may transmit coresets in a slot of a subframe before transmitting the PDSCH to the UE 415. For example, the base station 405 may have access to three symbols (e.g., S0 through S2) in a slot before the symbols used to transmit the PDSCH and broadcast information. In this example, the base station 405 may transmit the indication, of the length of the downlink symbols used to transmit the PDSCH, in a DCI on a PDCCH during the three symbols (e.g., S0 through S2) in the slot.

At 440, the UE 415 may receive the PDSCH over a plurality of downlink symbols. In some cases, the UE 415 may receive the PDSCH over the plurality of downlink symbols while being outside of an RRC connected state. The PDSCH may include broadcast information (e.g., RMSI, OSI). The plurality of downlink symbols may correspond to the length of downlink symbols provided in the indication transmitted from the base station 405.

At 445, the UE 415 may perform a blind decoding of the PDSCH over a first set of the plurality of downlink symbols. In some cases, the UE 415 may select the first set of the set of downlink symbols based on a preconfigured rule (e.g., a network operator and administrator may assign a set of lengths of downlink symbols used for PDSCH transmission and reception). At 450, the UE 415 may determine whether the blind decoding was successful using the first set of the plurality of downlink symbols.

In some cases, the additional broadcast information may be represented using codeword that may be a multiple of two or three in length compared to a length (e.g., bits) of the additional broadcast information. The extra bits may provide additional redundant information for the UE 415 to recover the additional broadcast information when decoding the PDSCH transmitted from the base station 405. The UE 415 may determine whether the PDSCH was decoded successfully or unsuccessfully based on a bit error or a code block CRC associated with codewords or packets (e.g., including broadcast information (RMSI, OSI)) carried on the PDSCH satisfying a threshold value. For example, upon performing a blind decoding of the PDSCH, the UE 415 may determine that a bit error of CRC is below a threshold value. As a result, the UE 415 may determine that the blind decoding of the PDSCH was successful.

In some cases, the UE 415 may determine a failure to successfully decode the PDSCH transmitted from the base station 405. In this case, the UE 415 may wait for the base station 405 to retransmit a PDSCH. The UE 415 may repeat this operation until a successful bind decoding of the PDSCH. At 455, the base station 405 may transmit a PDSCH to the UE 415. Upon receiving the PDSCH from the base station 405; at 460, the UE 415 may perform a blind decoding of the PDSCH over a second set of the plurality of downlink symbols. The UE 415 may select the second set of the set of downlink symbols based on the preconfigured rule. The UE 415 may repeat the blind decoding operation using all possible sets of downlink symbols indicated to the UE 415 e.g., via DCI, until the UE 415 determines that the blind decoding of the PDSCH was successful.

Figure 5:
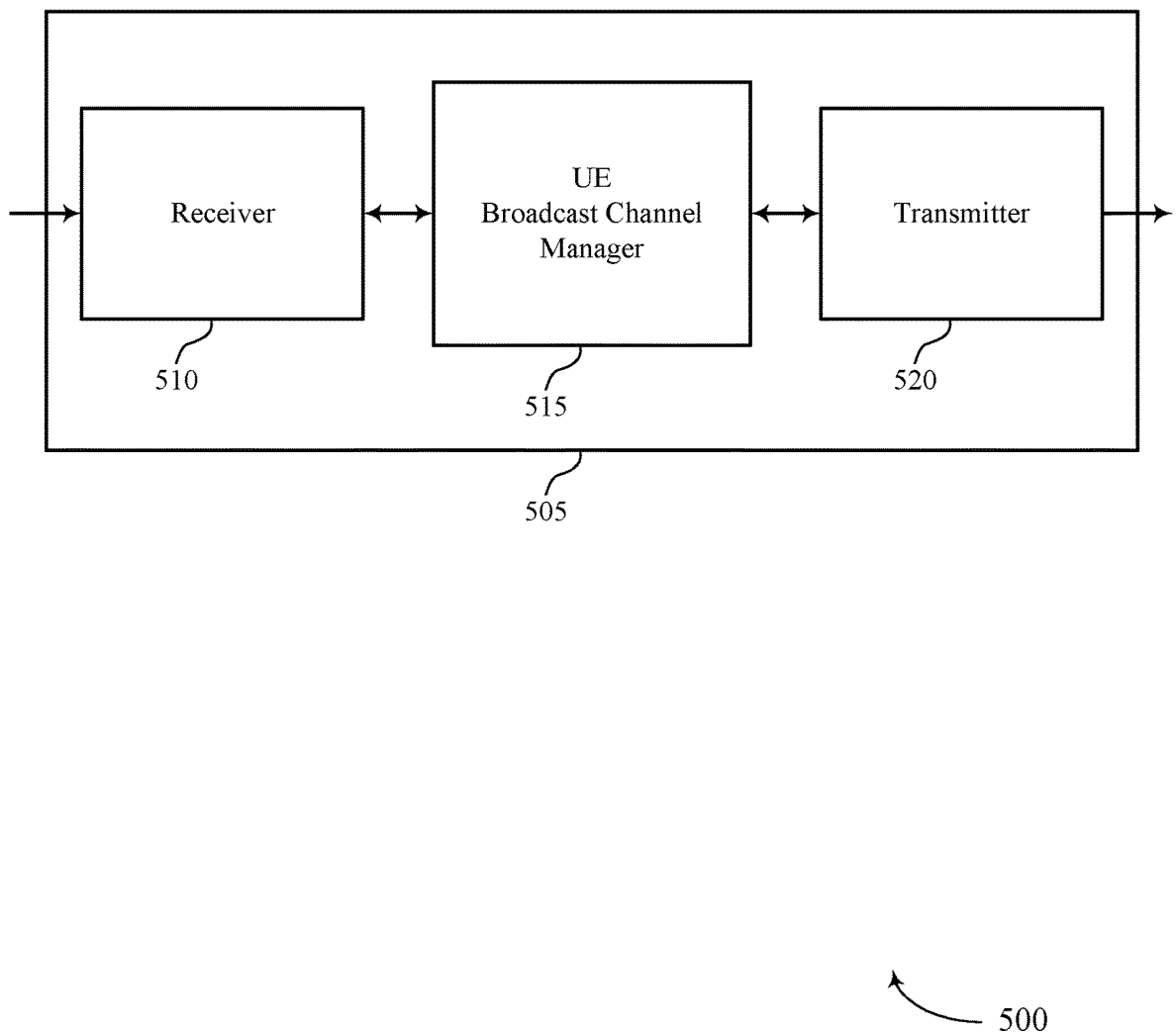
FIGS. 5 and 6 show block diagrams of wireless devices that support rate matching for broadcast channels in accordance with aspects of the present disclosure.

FIG. 5 shows a block diagram 500 of a wireless device 505 that supports rate matching for broadcast channels in accordance with aspects of the present disclosure. Wireless device 505 may be an example of aspects of a UE 115 as described herein. Wireless device 505 may include receiver 510, UE broadcast channel manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to rate matching for broadcast channels, etc.). Information may be passed on to other components of the device. The receiver 510 may be an example of aspects of the transceiver 835 described with reference to FIG. 8. The receiver 510 may utilize a single antenna or a set of antennas.

UE broadcast channel manager 515 and/or at least some of its various sub-components may be implemented in hardware, software executed by a processor, firmware, or any combination thereof. If implemented in software executed by a processor, the functions of the UE broadcast channel manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE broadcast channel manager 515 and/or at least some of its various sub-components may be physically located at various positions, including being distributed such that portions of functions are implemented at different physical locations by one or more physical devices. In some examples, UE broadcast channel manager 515 and/or at least some of its various sub-components may be a separate and distinct component in accordance with various aspects of the present disclosure. In other examples, UE broadcast channel manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE broadcast channel manager 515 may also receive, from a base station and while being outside of an RRC connected state, an indication of a length of downlink symbols used to transmit a PDSCH that carries broadcast information, the length being from a starting downlink symbol index to an ending downlink symbol index, and decode the PDSCH based on the indication. The UE broadcast channel manager 515 may also receive, from a base station, a PDSCH over a set of downlink symbols and while being outside of an RRC connected state. The PDSCH may carry broadcast information. UE broadcast channel manager 515 may perform a blind decoding of the PDSCH over a first set of the set of downlink symbols and perform a blind decoding of the PDSCH during a second set of the set of downlink symbols. In some examples, the second set being different in length than the first set.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
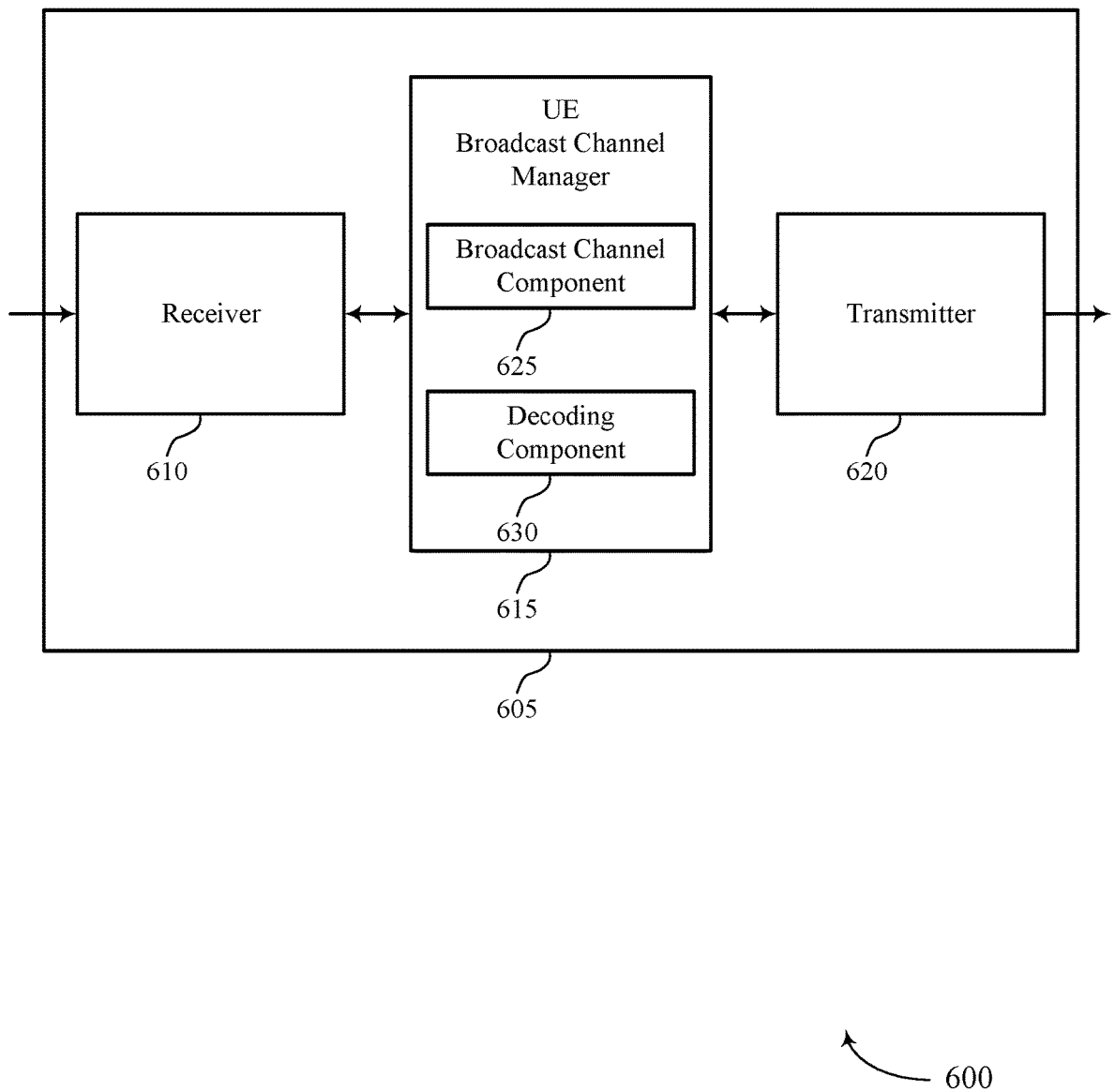

FIG. 6 shows a block diagram 600 of a wireless device 605 that supports rate matching for broadcast channels in accordance with aspects of the present disclosure. Wireless device 605 may be an example of aspects of a wireless device 505 or a UE 115 as described with reference to FIG. 5. Wireless device 605 may include receiver 610, UE broadcast channel manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to rate matching for broadcast channels, etc.). Information may be passed on to other components of the device. The receiver 610 may be an example of aspects of the transceiver 835 described with reference to FIG. 8. The receiver 610 may utilize a single antenna or a set of antennas.

UE broadcast channel manager 615 may be an example of aspects of the UE broadcast channel manager 515 described with reference to FIG. 5. UE broadcast channel manager 615 may also include broadcast channel component 625 and decoding component 630.

Broadcast channel component 625 may receive, from a base station, a PDSCH over a set of downlink symbols and while being outside of an RRC connected state. In some examples, the PDSCH may carry broadcast information. In some cases, broadcast channel component 625 may receive, from a base station and while being outside of an RRC connected state, an indication of a length of downlink symbols used to transmit a PDSCH that carries the broadcast information, the length being from a starting downlink symbol index to an ending downlink symbol index. In some cases, the broadcast information includes RMSI or OSI, or both. In some cases, the length may be a fixed length of downlink symbols. In some cases, the indication of the length of downlink symbols used to transmit the PDSCH is received before an RRC configuration procedure between the UE and the base station.

Decoding component 630 may perform a blind decoding of the PDSCH over a first set of the set of downlink symbols or perform a blind decoding of the PDSCH during a second set of the set of downlink symbols, or both. In some examples, the second set may be different in length than the first set. The decoding component 630 may decode the PDSCH based on the indication.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
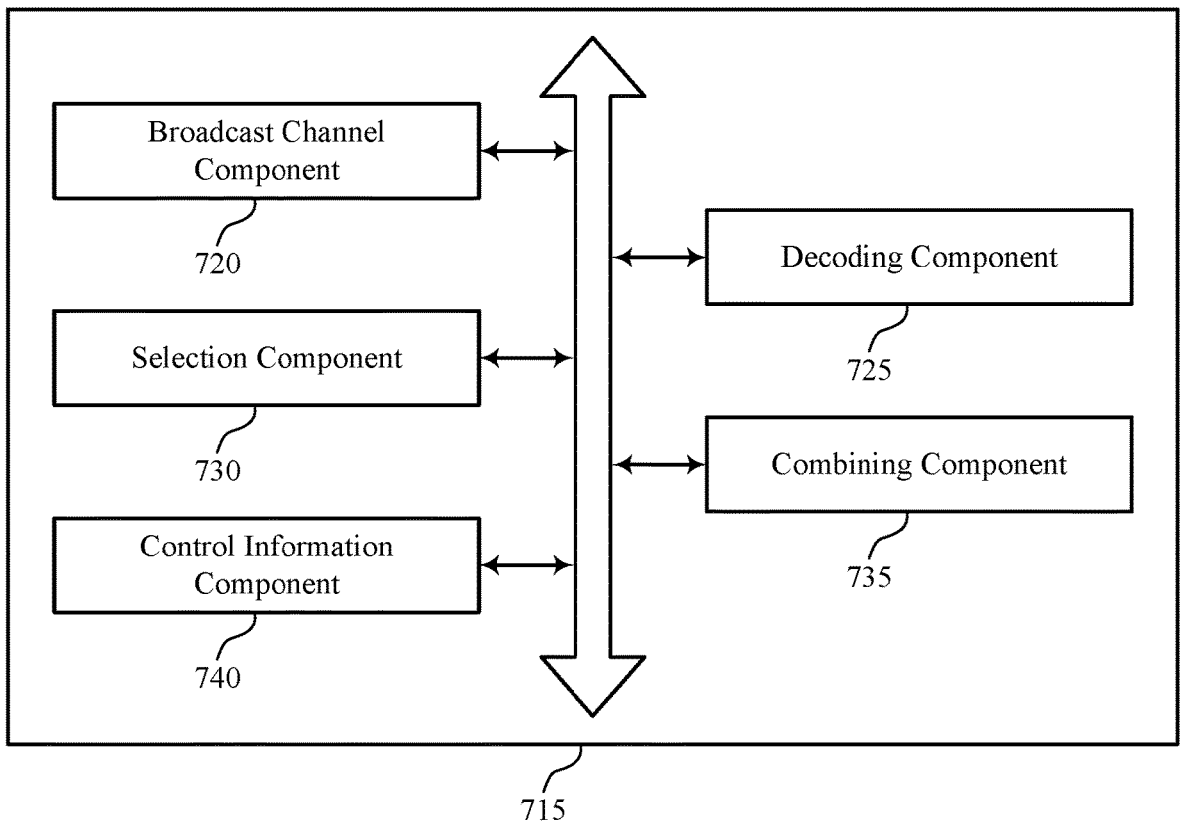
FIG. 7 shows a block diagram of a user equipment (UE) broadcast channel manager that supports rate matching for broadcast channels in accordance with aspects of the present disclosure.

FIG. 7 shows a block diagram 700 of a UE broadcast channel manager 715 that supports rate matching for broadcast channels in accordance with aspects of the present disclosure. The UE broadcast channel manager 715 may be an example of aspects of a UE broadcast channel manager 615, a UE broadcast channel manager 815, or a UE broadcast channel manager 715 described with reference to FIGS. 6, 8, and 9. The UE broadcast channel manager 715 may include broadcast channel component 720, decoding component 725, selection component 730, combining component 735, and control information component 740. Each of these modules may communicate, directly or indirectly, with one another (e.g., via one or more buses).

Broadcast channel component 720 may receive, from a base station, a PDSCH over a set of downlink symbols and while being outside of an RRC connected state, the PDSCH may carry broadcast information. The broadcast channel component 720 may receive, from a base station and while being outside of an RRC connected state, an indication of a length of downlink symbols used to transmit a PDSCH that carries broadcast information, the length being from a starting downlink symbol index to an ending downlink symbol index. In some cases, the broadcast information includes RMSI or OSI, or both. In some cases, the length may be a fixed length of downlink symbols. In some cases, the indication of the length of downlink symbols used to transmit the PDSCH may be received before an RRC configuration procedure between the UE and the base station.

Decoding component 725 may perform a blind decoding of the PDSCH over a first set of the set of downlink symbols or perform a blind decoding of the PDSCH during a second set of the set of downlink symbols, or both. In some examples, the second set may be different in length than the first set. The decoding component 725 may decode the PDSCH based on the indication.

Selection component 730 may select the first set of the set of downlink symbols or the second set of the set of downlink symbols based on a preconfigured rule. Selection component 730 may select the first set of the set of downlink symbols based on the preconfigured rule, where performing the blind decoding of the PDSCH is based on the selected first set of the set of downlink symbols. Selection component 730 may select the second set of the set of downlink symbols based on the preconfigured rule, where performing the blind decoding of the PDSCH is based on the selected second set of the set of downlink symbols. In some cases, the preconfigured rule may include a minimum number of downlink symbols or a maximum number of downlink symbols of the set of downlink symbols. In some cases, the minimum number of downlink symbols or the maximum number of downlink symbols, or both, are indicated in DCI. In some cases, the minimum number of downlink symbols or the maximum number of downlink symbols, or both, are predefined. For example, a network operator or administrator may define the minimum number of downlink symbols or the maximum number of downlink symbols, or both, in an operating specification of the base station or the UE.

Combining component 735 may perform a soft combining of LLRs of coded bits of the PDSCH based on the coded bits being within the minimum number of downlink symbols. Control information component 740 may receive a DCI from the base station, where the indication of the length of downlink symbols used to transmit the PDSCH by the base station is received in the DCI. Control information component 740 may identify the length of downlink symbols used to transmit the PDSCH based on a bit value in a DCI field received in the DCI. Control information component 740 may receive control information in a MIB on a PBCH from the base station, determine the starting downlink symbol index of the PDSCH based on the control information in the MIB, and determine the ending downlink symbol index of the PDSCH based on receiving control information in a DCI on a PDCCH from the base station, where decoding the PDSCH is based on the starting downlink symbol index and the ending downlink symbol index.

Figure 8:
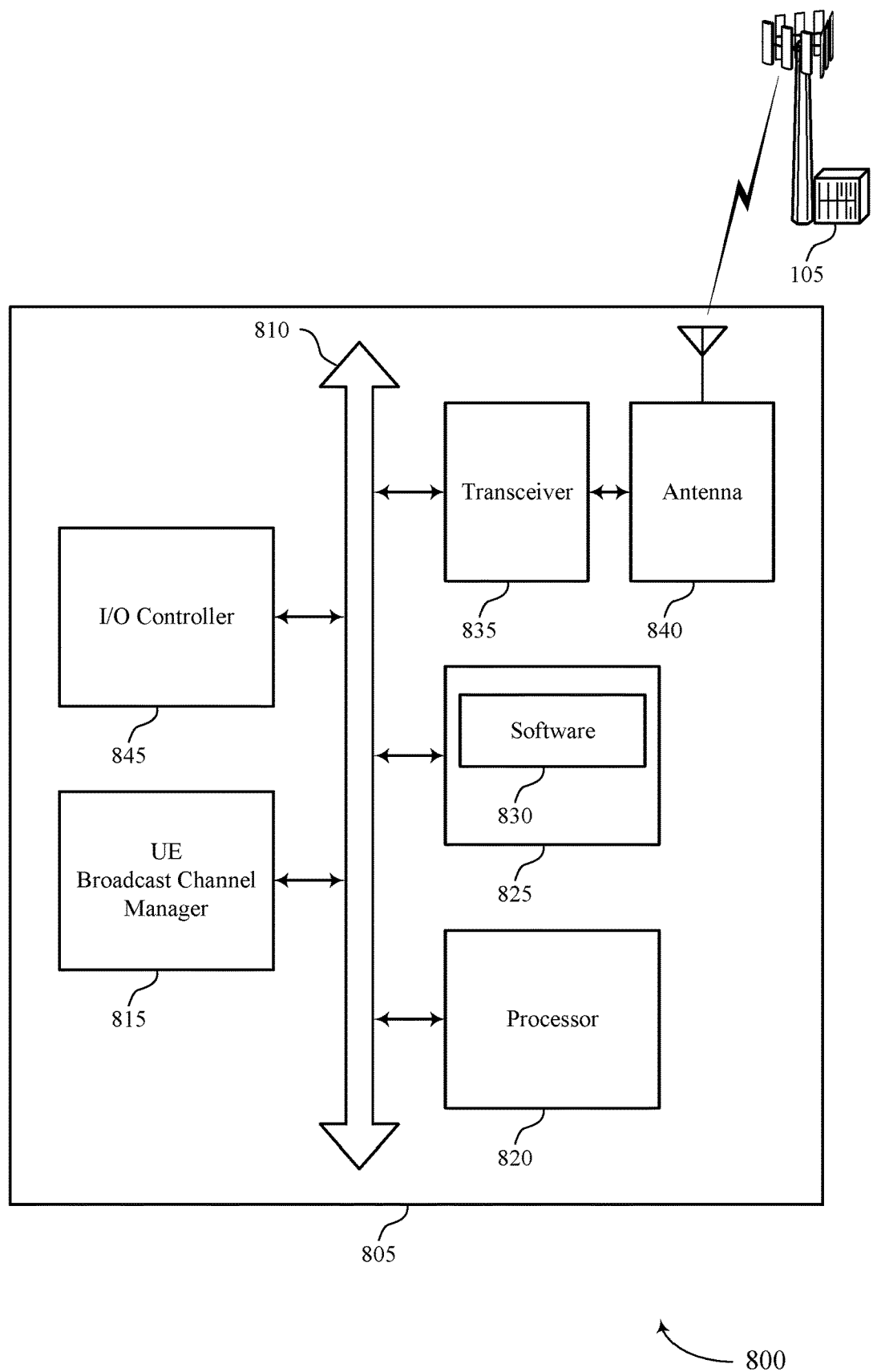
FIG. 8 shows a diagram of a system including a device that supports rate matching for broadcast channels in accordance with aspects of the present disclosure.

FIG. 8 shows a diagram of a system 800 including a device 805 that supports rate matching for broadcast channels in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE broadcast channel manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting rate matching for broadcast channels).

Memory 825 may include random access memory (RAM) and read-only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support rate matching for broadcast channels. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
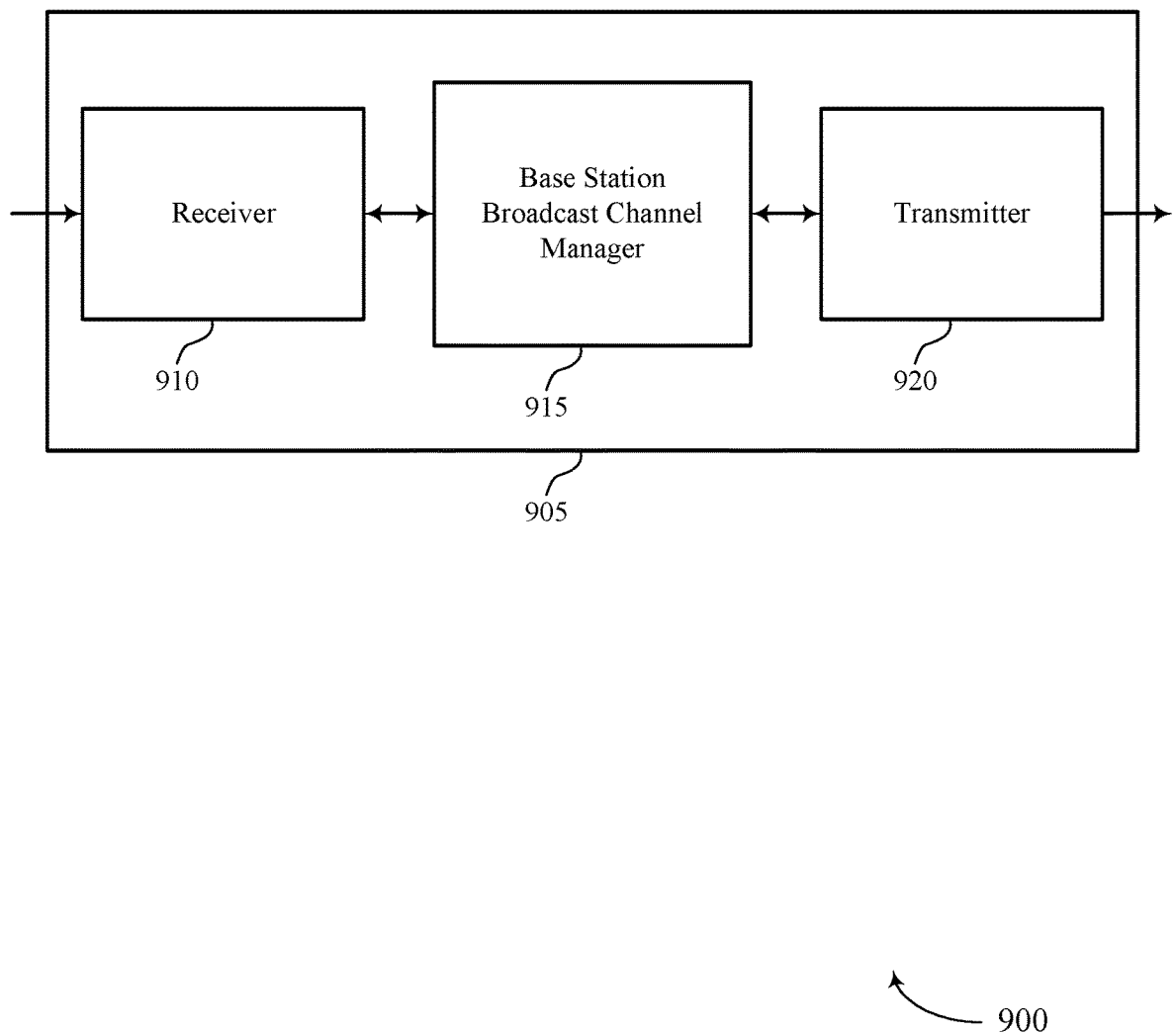
FIGS. 9 and 10 show block diagrams of wireless devices that support rate matching for broadcast channels in accordance with aspects of the present disclosure.

FIG. 9 shows a block diagram 900 of a wireless device 905 that supports rate matching for broadcast channels in accordance with aspects of the present disclosure. Wireless device 905 may be an example of aspects of a base station 105 as described herein. Wireless device 905 may include receiver 910, base station broadcast channel manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to rate matching for broadcast channels, etc.). Information may be passed on to other components of the device. The receiver 910 may be an example of aspects of the transceiver 1235 described with reference to FIG. 12. The receiver 910 may utilize a single antenna or a set of antennas.

Base station broadcast channel manager 915 may be an example of aspects of the base station broadcast channel manager 1215 described with reference to FIG. 12.

Base station broadcast channel manager 915 and/or at least some of its various sub-components may be implemented in hardware, software executed by a processor, firmware, or any combination thereof. If implemented in software executed by a processor, the functions of the base station broadcast channel manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station broadcast channel manager 915 and/or at least some of its various sub-components may be physically located at various positions, including being distributed such that portions of functions are implemented at different physical locations by one or more physical devices. In some examples, base station broadcast channel manager 915 and/or at least some of its various sub-components may be a separate and distinct component in accordance with various aspects of the present disclosure. In other examples, base station broadcast channel manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station broadcast channel manager 915 may identify a length of downlink symbols used to transmit a PDSCH that carries broadcast information to a UE while the UE is outside of an RRC connected state, the length being from a starting downlink symbol index to an ending downlink symbol index and transmit the indication to the UE.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
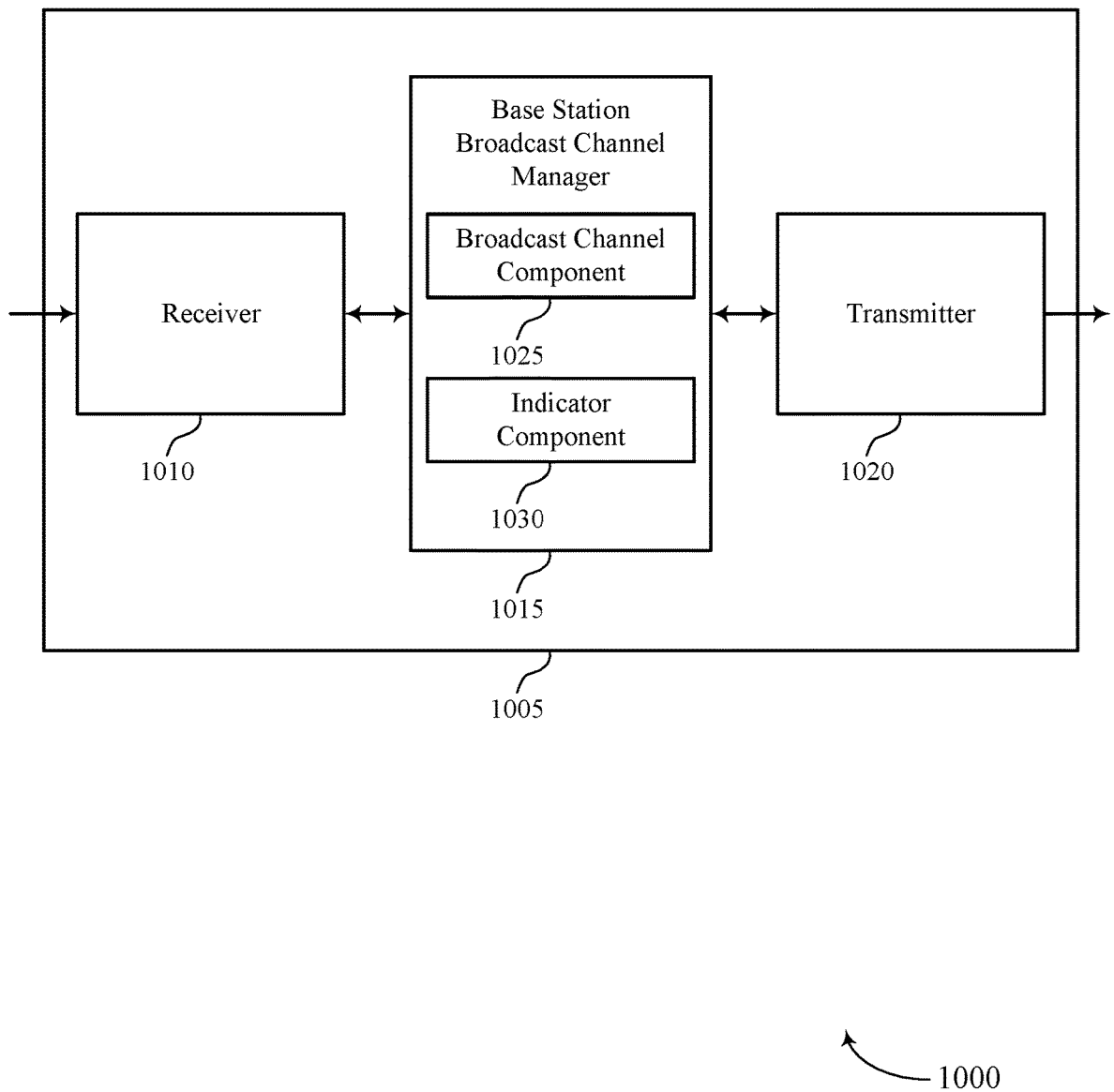

FIG. 10 shows a block diagram 1000 of a wireless device 1005 that supports rate matching for broadcast channels in accordance with aspects of the present disclosure. Wireless device 1005 may be an example of aspects of a wireless device 905 or a base station 105 as described with reference to FIG. 9. Wireless device 1005 may include receiver 1010, base station broadcast channel manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to rate matching for broadcast channels, etc.). Information may be passed on to other components of the device. The receiver 1010 may be an example of aspects of the transceiver 1235 described with reference to FIG. 12. The receiver 1010 may utilize a single antenna or a set of antennas.

Base station broadcast channel manager 1015 may be an example of aspects of the base station broadcast channel manager 1115 described with reference to FIG. 11. Base station broadcast channel manager 1015 may also include broadcast channel component 1025 and indicator component 1030.

Broadcast channel component 1025 may identify a length of downlink symbols used to transmit a PDSCH that carries broadcast information to a UE while the UE is outside of an RRC connected state, the length being from a starting downlink symbol index to an ending downlink symbol index and determine the length of downlink symbols used to transmit the PDSCH carrying broadcast information based on a preconfigured rule. In some cases, the broadcast information includes RMSI or OSI, or both.

Indicator component 1030 may transmit the indication to the UE. Indicator component 1030 may provide, to the UE, an indication of the starting downlink symbol index based on transmitting control information in a MIB on a PBCH and transmit the indication of the length of downlink symbols in a DCI on a PDCCH.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
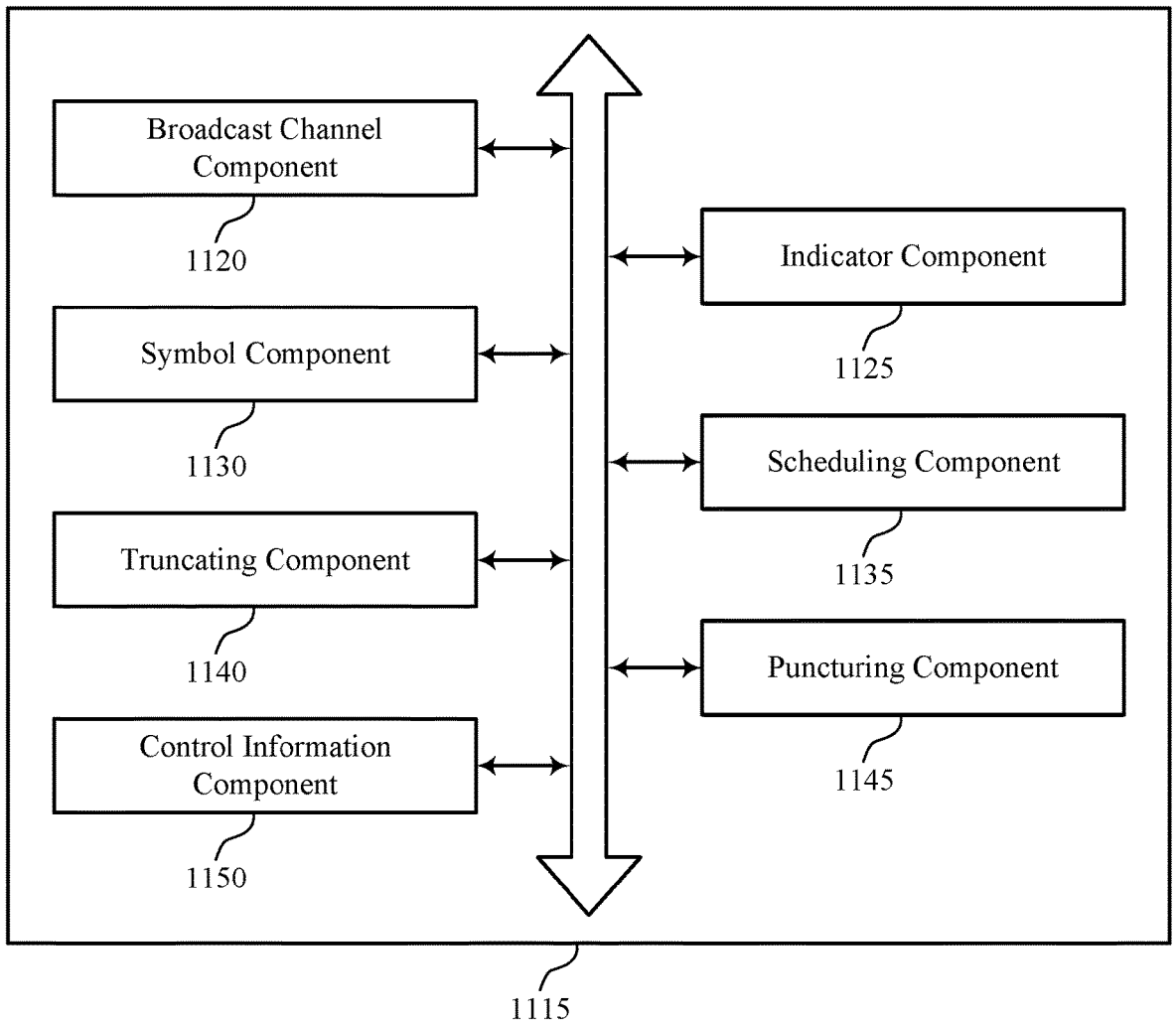
FIG. 11 shows a block diagram of a base station broadcast channel manager that supports rate matching for broadcast channels in accordance with aspects of the present disclosure.

FIG. 11 shows a block diagram 1100 of a base station broadcast channel manager 1115 that supports rate matching for broadcast channels in accordance with aspects of the present disclosure. The base station broadcast channel manager 1115 may be an example of aspects of a base station broadcast channel manager described with reference to FIGS. 9, 10, and 12. The base station broadcast channel manager 1115 may include broadcast channel component 1120, indicator component 1125, symbol component 1130, scheduling component 1135, truncating component 1140, puncturing component 1145, and control information component 1150. Each of these modules may communicate, directly or indirectly, with one another (e.g., via one or more buses).

Broadcast channel component 1120 may identify a length of downlink symbols used to transmit a PDSCH that carries broadcast information to a UE while the UE is outside of an RRC connected state, the length being from a starting downlink symbol index to an ending downlink symbol index and determine the length of downlink symbols used to transmit the PDSCH carrying broadcast information based on a preconfigured rule. In some cases, the broadcast information includes RMSI or OSI, or both.

Indicator component 1125 may transmit the indication to the UE. Indicator component 1125 may provide, to the UE, an indication of the starting downlink symbol index based on transmitting control information in a MIB on a PBCH and transmit the indication of the length of downlink symbols in a DCI on a PDCCH.

Symbol component 1130 may assign a set of downlink symbols for transmission of the PDSCH carrying the broadcast information based on a preconfigured rule. Symbol component 1130 may identify a set of downlink symbols associated with slot of a frame, determine that the identified set of downlink symbols satisfy the assigned set of downlink symbols, where scheduling the PDSCH is based on the identified set of downlink symbols associated with the slot satisfying the assigned set of set of downlink symbols used to transmit the PDSCH. Symbol component 1130 may determine that the identified set of downlink symbols is below the assigned set of downlink symbols, and refrain from scheduling the PDSCH during the slot. Symbol component 1130 may determine that the identified set of downlink symbols is above the assigned set of downlink symbols. Symbol component 1130 may determine a minimum set of downlink symbols for transmission of the PDSCH carrying the broadcast information and determine a maximum set of downlink symbols for transmission of the PDSCH carrying the broadcast information. In some cases, the assigned set of downlink symbols is variable based on the PDSCH carrying RMSI or OSI.

Scheduling component 1135 may schedule the PDSCH based on the assigned set of downlink symbols. Truncating component 1140 may truncate a set of unused downlink symbols associated with the slot, where scheduling the PDSCH is based on the truncating. Puncturing component 1145 may puncture the set of unused downlink symbols associated with the slot. Control information component 1150 may assign a bit value associated with a DCI field of the DCI, the bit value indicating the length of downlink symbols.

Figure 12:
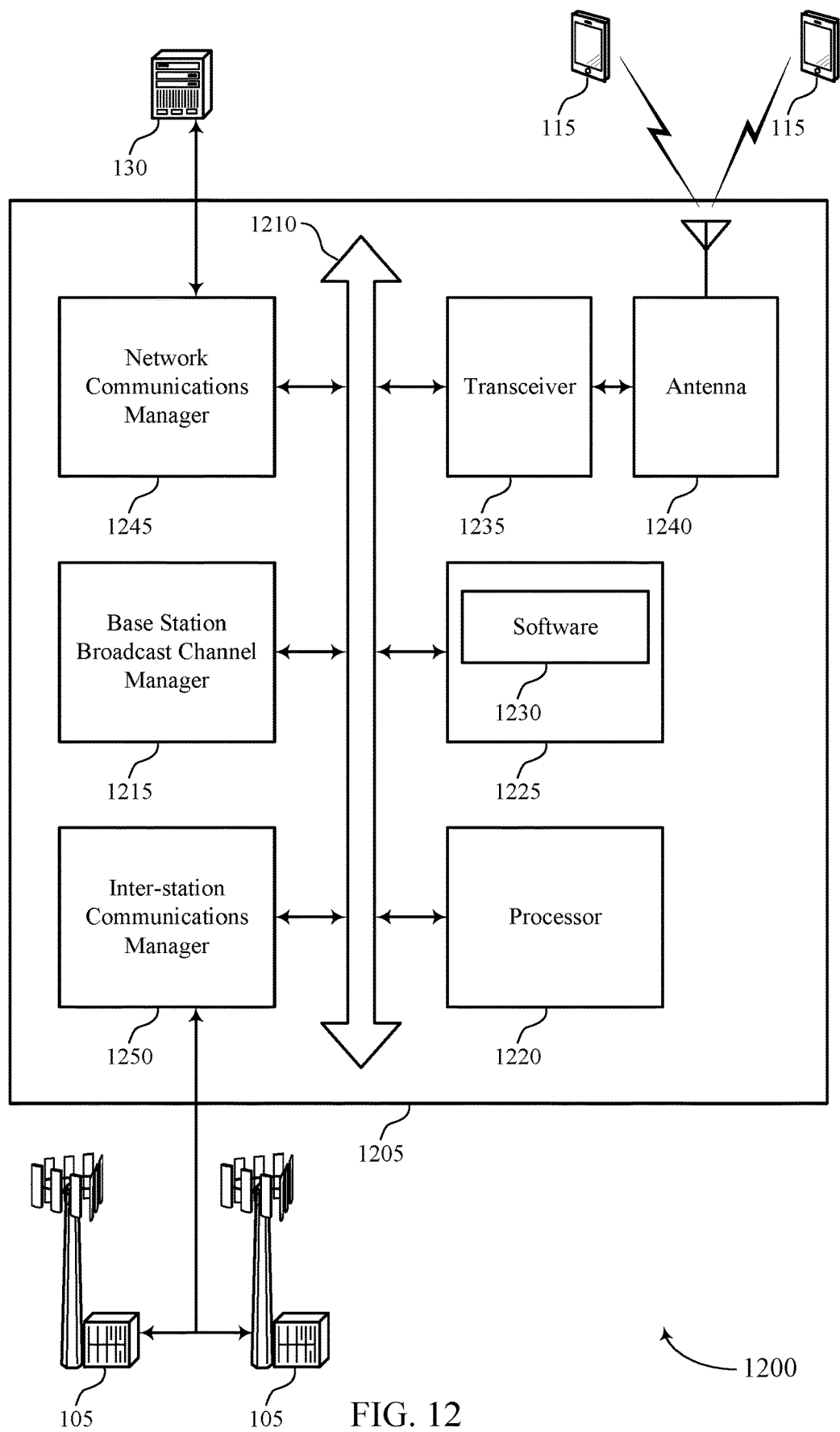
FIG. 12 illustrates a diagram of a system including a device that supports rate matching for broadcast channels in accordance with aspects of the present disclosure.

FIG. 12 shows a diagram of a system 1200 including a device 1205 that supports rate matching for broadcast channels in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station broadcast channel manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting rate matching for broadcast channels).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support rate matching for broadcast channels. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105 and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communications network technology to provide communication between base stations 105.

Figure 13:
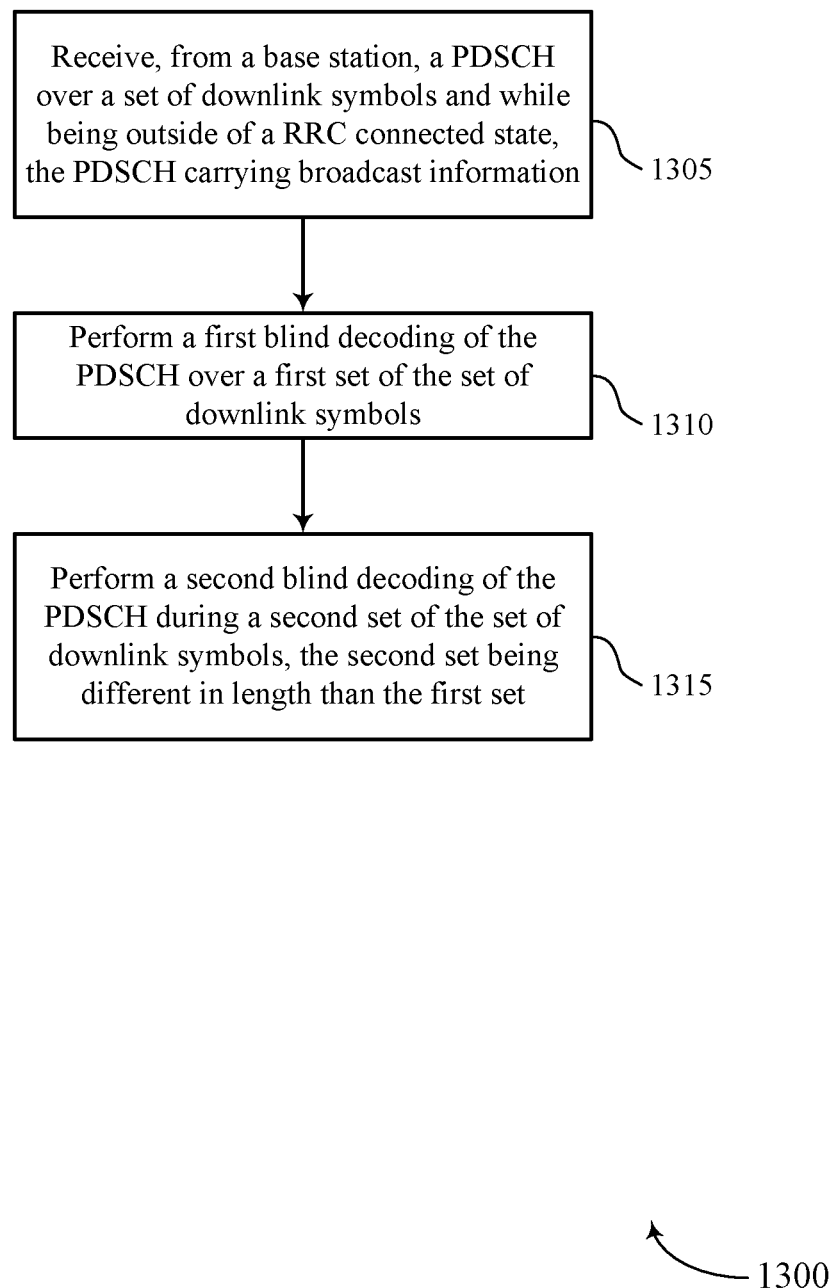
FIGS. 13 through 17 show flowcharts illustrating methods for rate matching for broadcast channels in accordance with aspects of the present disclosure.

FIG. 13 shows a flowchart illustrating a method 1300 for rate matching for broadcast channels in accordance with aspects of the present disclosure. The operations of method 1300 may be implemented by a UE 115 or its components as described herein. For example, the operations of method 1300 may be performed by a UE broadcast channel manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive, from a base station, a PDSCH over a plurality of downlink symbols and while being outside of an RRC connected state, the PDSCH carrying broadcast information. The operations of 1305 may be performed according to the methods described herein. In certain examples, aspects of the operations of 1305 may be performed by a broadcast channel component as described with reference to FIGS. 5 through 8.

At 1310 the UE 115 may perform a first blind decoding of the PDSCH over a first set of the plurality of downlink symbols. The operations of 1310 may be performed according to the methods described herein. In certain examples, aspects of the operations of 1310 may be performed by a decoding component as described with reference to FIGS. 5 through 8.

At 1315 the UE 115 may perform a second blind decoding of the PDSCH during a second set of the plurality of downlink symbols, the second set being different in length than the first set. The operations of 1315 may be performed according to the methods described herein. In certain examples, aspects of the operations of 1315 may be performed by a decoding component as described with reference to FIGS. 5 through 8.

Figure 14:
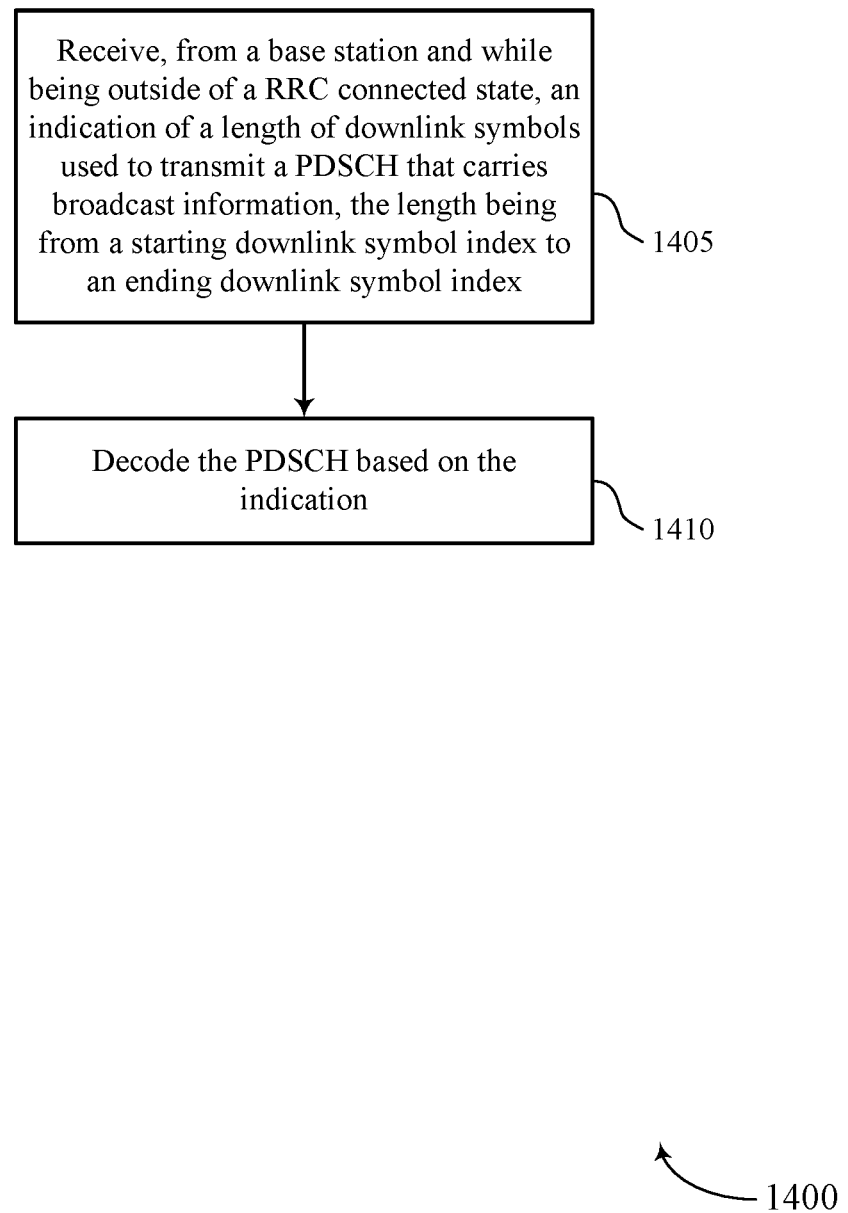

FIG. 14 shows a flowchart illustrating a method 1400 for rate matching for broadcast channels in accordance with aspects of the present disclosure. The operations of method 1400 may be implemented by a UE 115 or its components as described herein. For example, the operations of method 1400 may be performed by a UE broadcast channel manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive, from a base station and while being outside of an RRC connected state, an indication of a length of downlink symbols used to transmit a PDSCH that carries broadcast information. The operations of 1405 may be performed according to the methods described herein. In certain examples, aspects of the operations of 1405 may be performed by a broadcast channel component as described with reference to FIGS. 5 through 8.

At 1410 the UE 115 may decode the PDSCH based at least in part on the indication. The operations of 1410 may be performed according to the methods described herein. In certain examples, aspects of the operations of 1410 may be performed by a decoding component as described with reference to FIGS. 5 through 8.

Figure 15:
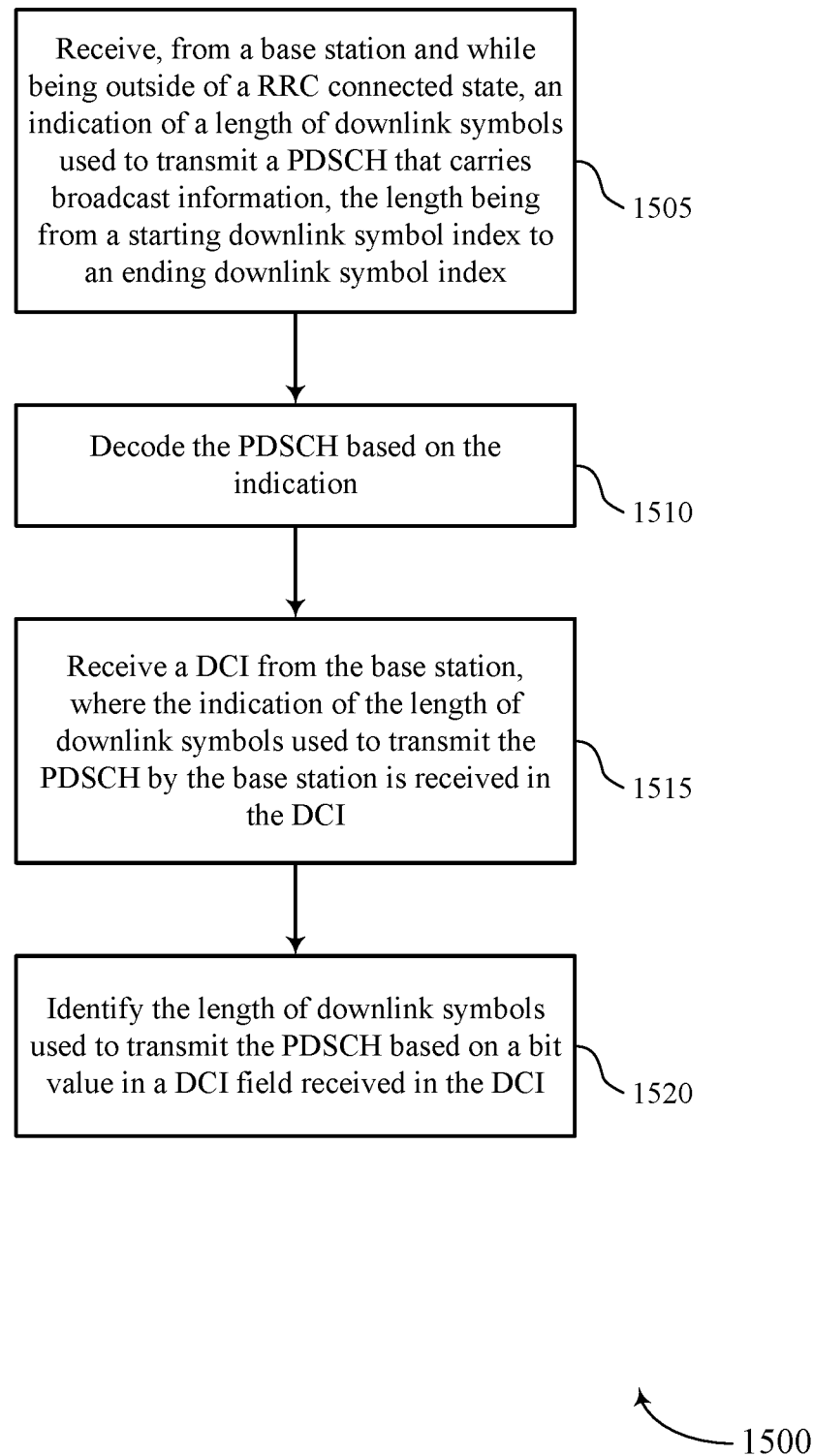

FIG. 15 shows a flowchart illustrating a method 1500 for rate matching for broadcast channels in accordance with aspects of the present disclosure. The operations of method 1500 may be implemented by a UE 115 or its components as described herein. For example, the operations of method 1500 may be performed by a UE broadcast channel manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, from a base station and while being outside of an RRC connected state, an indication of a length of downlink symbols used to transmit a PDSCH that carries broadcast information. The operations of 1505 may be performed according to the methods described herein. In certain examples, aspects of the operations of 1505 may be performed by a broadcast channel component as described with reference to FIGS. 5 through 8.

At 1510 the UE 115 may decode the PDSCH based at least in part on the indication. The operations of 1510 may be performed according to the methods described herein. In certain examples, aspects of the operations of 1510 may be performed by a decoding component as described with reference to FIGS. 5 through 8.

At 1515 the UE 115 may receive a DCI from the base station, wherein the indication of the length of downlink symbols used to transmit the PDSCH by the base station is received in the DCI. The operations of 1515 may be performed according to the methods described herein. In certain examples, aspects of the operations of 1515 may be performed by a control information component as described with reference to FIGS. 5 through 8.

At 1520 the UE 115 may identify the length of downlink symbols used to transmit the PDSCH based at least in part on a bit value in a DCI field received in the DCI. The operations of 1520 may be performed according to the methods described herein. In certain examples, aspects of the operations of 1520 may be performed by a control information component as described with reference to FIGS. 5 through 8.

Figure 16:
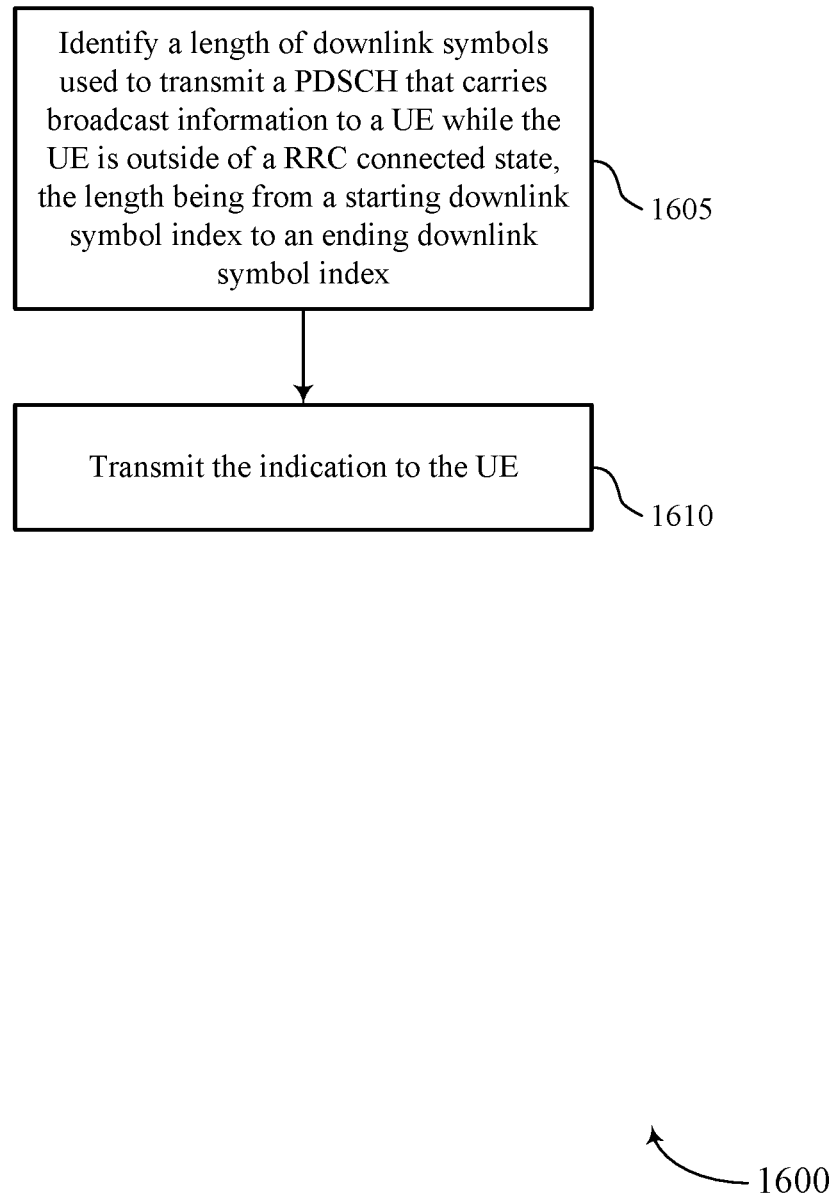

FIG. 16 shows a flowchart illustrating a method 1600 for rate matching for broadcast channels in accordance with aspects of the present disclosure. The operations of method 1600 may be implemented by a base station 105 or its components as described herein. For example, the operations of method 1600 may be performed by a base station broadcast channel manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify a length of downlink symbols used to transmit a PDSCH that carries broadcast information to a UE while the UE is outside of an RRC connected state. The operations of 1605 may be performed according to the methods described herein. In certain examples, aspects of the operations of 1605 may be performed by a broadcast channel component as described with reference to FIGS. 9 through 12.

At 1610 the base station 105 may transmit the indication to the UE. The operations of 1610 may be performed according to the methods described herein. In certain examples, aspects of the operations of 1610 may be performed by an indicator component as described with reference to FIGS. 9 through 12.

Figure 17:
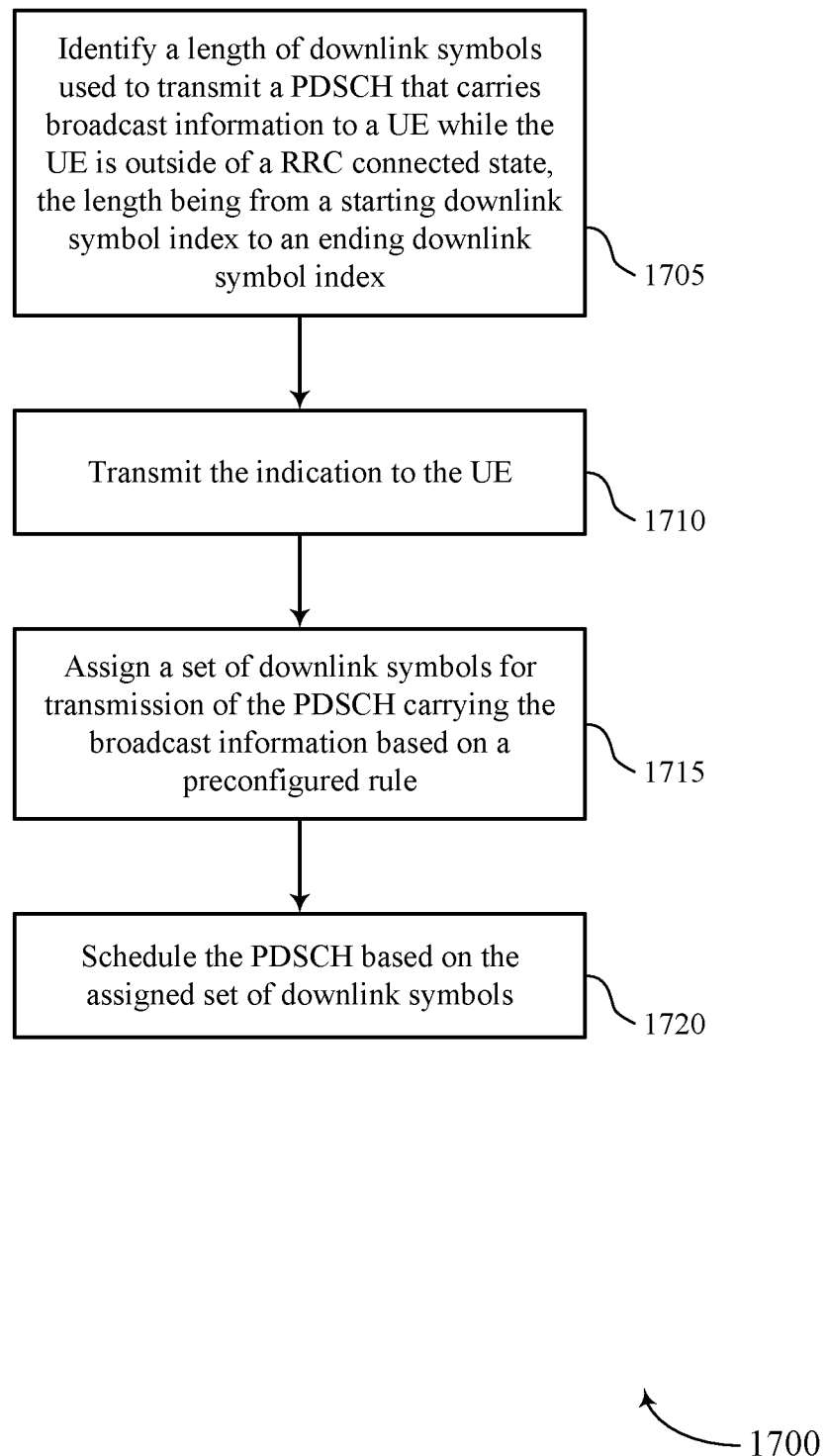

FIG. 17 shows a flowchart illustrating a method 1700 for rate matching for broadcast channels in accordance with aspects of the present disclosure. The operations of method 1700 may be implemented by a base station 105 or its components as described herein. For example, the operations of method 1700 may be performed by a base station broadcast channel manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may identify a length of downlink symbols used to transmit a PDSCH that carries broadcast information to a UE while the UE is outside of an RRC connected state. The operations of 1705 may be performed according to the methods described herein. In certain examples, aspects of the operations of 1705 may be performed by a broadcast channel component as described with reference to FIGS. 9 through 12.

At 1710 the base station 105 may transmit the indication to the UE. The operations of 1710 may be performed according to the methods described herein. In certain examples, aspects of the operations of 1710 may be performed by an indicator component as described with reference to FIGS. 9 through 12.

At 1715 the base station 105 may assign a set of downlink symbols for transmission of the PDSCH carrying the broadcast information based at least in part on a preconfigured rule. The operations of 1715 may be performed according to the methods described herein. In certain examples, aspects of the operations of 1715 may be performed by a symbol component as described with reference to FIGS. 9 through 12.

At 1720 the base station 105 may schedule the PDSCH based at least in part on the assigned set of downlink symbols. The operations of 1720 may be performed according to the methods described herein. In certain examples, aspects of the operations of 1720 may be performed by a scheduling component as described with reference to FIGS. 9 through 12.

In some examples, aspects from two or more of the described methods may be combined. It should be noted that the described methods are just example implementations, and that the operations of the described methods may be rearranged or otherwise modified such that other implementations are possible.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, from a base station and while being outside of a radio resource control (RRC) connected state, an indication of a length of downlink symbols used to transmit a physical downlink shared channel (PDSCH) that carries broadcast information, the length being from a starting downlink symbol index to an ending downlink symbol index, wherein the indication of the length of downlink symbols used to transmit the PDSCH is received before a radio resource control (RRC) configuration procedure between the UE and the base station; and
decoding the PDSCH based at least in part on the indication.

2. The method of claim 1, wherein the broadcast information comprises remaining minimum system information (RMSI) or other system information (OSI), or both.

3. The method of claim 1, wherein the length is a fixed length of downlink symbols.

4. The method of claim 1, further comprising:
receiving a downlink control information (DCI) from the base station, wherein the indication of the length of downlink symbols used to transmit the PDSCH by the base station is received in the DCI.

5. The method of claim 4, further comprising:
identifying the length of downlink symbols used to transmit the PDSCH based at least in part on a bit value in a DCI field received in the DCI, wherein a demodulation reference signal (DMRS) pattern is associated with the bit value in the DCI field.

6. The method of claim 1, further comprising:
receiving control information in a master information block (MIB) on a physical broadcast channel (PBCH) from the base station;
determining the starting downlink symbol index of the PDSCH based at least in part on the control information in the MIB; and
determining the ending downlink symbol index of the PDSCH based at least in part on receiving control information in a DCI on a physical downlink control channel (PDCCH) from the base station, wherein decoding the PDSCH is based at least in part on the starting downlink symbol index and the ending downlink symbol index.

7. A method for wireless communication, comprising:
identifying, at a base station, an indication of a length of downlink symbols used to transmit a physical downlink shared channel (PDSCH) that carries broadcast information to a user equipment (UE) while the UE is outside of a radio resource control (RRC) connected state, the length being from a starting downlink symbol index to an ending downlink symbol index; and
transmitting, before a radio resource control (RRC) configuration procedure between the UE and the base station, the indication to the UE.

8. The method of claim 7, wherein the broadcast information comprises remaining minimum system information (RMSI) or other system information (OSI), or both.

9. The method of claim 7, further comprising:
providing, to the UE, an indication of the starting downlink symbol index based at least in part on transmitting control information in a master information block (MIB) on a physical broadcast channel (PBCH).

10. The method of claim 7, further comprising:
assigning a set of downlink symbols for transmission of the PDSCH carrying the broadcast information based at least in part on a preconfigured rule; and
scheduling the PDSCH based at least in part on the assigned set of downlink symbols.

11. The method of claim 10, wherein the assigned set of downlink symbols is variable based at least in part on the PDSCH carrying RMSI or OSI.

12. The method of claim 10, further comprising:
identifying a plurality of downlink symbols associated with a slot of a frame; and determining that the identified plurality of downlink symbols satisfy the assigned set of downlink symbols, wherein scheduling the PDSCH is based at least in part on the identified plurality of downlink symbols satisfying the assigned set of downlink symbols used to transmit the PDSCH.

13. The method of claim 12, further comprising:
determining that the identified plurality of downlink symbols is less than the assigned set of downlink symbols; and
refraining from scheduling the PDSCH during the slot.

14. The method of claim 12, further comprising:
determining that the identified plurality of downlink symbols is greater than the assigned set of downlink symbols; and
truncating a set of unused downlink symbols associated with the slot, wherein scheduling the PDSCH is based at least in part on the truncating.

15. The method of claim 14, further comprising:
puncturing the set of unused downlink symbols associated with the slot.

16. The method of claim 10, further comprising:
determining a minimum set of downlink symbols for transmission of the PDSCH carrying the broadcast information; and
determining a maximum set of downlink symbols for transmission of the PDSCH carrying the broadcast information.

17. The method of claim 7, further comprising:
transmitting the indication of the length of downlink symbols in a downlink control information (DCI) on a physical downlink control channel (PDCCH).

18. The method of claim 7, further comprising:
determining the length of downlink symbols used to transmit the PDSCH carrying broadcast information based at least in part on a preconfigured rule; and
assigning a bit value associated with a DCI field of the DCI, the bit value indicating the length of downlink symbols.

19. An apparatus for wireless communication, comprising:
a processor;
memory coupled with the processor; and
instructions stored in the memory and executable by the processor to cause the apparatus to:
receive, from a base station and while being outside of a radio resource control (RRC) connected state, an indication of a length of downlink symbols used to transmit a physical downlink shared channel (PDSCH) that carries broadcast information, the length being from a starting downlink symbol index to an ending downlink symbol index, wherein the indication of the length of downlink symbols used to transmit the PDSCH is received before a radio resource control (RRC) configuration procedure between the UE and the base station; and
decode the PDSCH based at least in part on the indication.

20. The apparatus of claim 19, wherein the broadcast information comprises remaining minimum system information (RMSI) or other system information (OSI), or both.

21. The apparatus of claim 19, wherein the length is a fixed length of downlink symbols.

22. The apparatus of claim 19, wherein the instructions are further executable by the processor to cause the apparatus to:
receive a downlink control information (DCI) from the base station, wherein the indication of the length of downlink symbols used to transmit the PDSCH by the base station is received in the DCI.

23. The apparatus of claim 22, wherein the instructions are further executable by the processor to cause the apparatus to:
identify the length of downlink symbols used to transmit the PDSCH based at least in part on a bit value in a DCI field received in the DCI, wherein a demodulation reference signal (DMRS) pattern is associated with the bit value in the DCI field.

24. The apparatus of claim 19, wherein the instructions are further executable by the processor to cause the apparatus to:
receive control information in a master information block (MIB) on a physical broadcast channel (PBCH) from the base station;
determine the starting downlink symbol index of the PDSCH based at least in part on the control information in the MIB; and
determine the ending downlink symbol index of the PDSCH based at least in part on receiving control information in a DCI on a physical downlink control channel (PDCCH) from the base station, wherein decoding the PDSCH is based at least in part on the starting downlink symbol index and the ending downlink symbol index.

25. An apparatus for wireless communication, comprising:
a processor;
memory coupled with the processor; and
instructions stored in the memory and executable by the processor to cause the apparatus to:
identify, at a base station, an indication of a length of downlink symbols used to transmit a physical downlink shared channel (PDSCH) that carries broadcast information to a user equipment (UE) while the UE is outside of a radio resource control (RRC) connected state, the length being from a starting downlink symbol index to an ending downlink symbol index; and
transmit, before a radio resource control (RRC) configuration procedure between the UE and the base station, the indication to the UE.

26. The apparatus of claim 25, wherein the broadcast information comprises remaining minimum system information (RMSI) or other system information (OSI), or both.

27. The apparatus of claim 25, wherein the instructions are further executable by the processor to cause the apparatus to:
provide, to the UE, an indication of the starting downlink symbol index based at least in part on transmitting control information in a master information block (MIB) on a physical broadcast channel (PBCH).

28. The apparatus of claim 25, wherein the instructions are further executable by the processor to cause the apparatus to:
assign a set of downlink symbols for transmission of the PDSCH carrying the broadcast information based at least in part on a preconfigured rule; and
schedule the PDSCH based at least in part on the assigned set of downlink symbols.

29. The apparatus of claim 28, wherein the assigned set of downlink symbols is variable based at least in part on the PDSCH carrying RMSI or OSI.

30. The apparatus of claim 28, wherein the instructions are further executable by the processor to cause the apparatus to:
- identify a plurality of downlink symbols associated with a slot of a frame; and
- determine that the identified plurality of downlink symbols satisfy the assigned set of downlink symbols, wherein scheduling the PDSCH is based at least in part on the identified plurality of downlink symbols satisfying the assigned set of downlink symbols used to transmit the PDSCH.

31. The apparatus of claim 30, wherein the instructions are further executable by the processor to cause the apparatus to:
- determine that the identified plurality of downlink symbols is less than the assigned set of downlink symbols; and
- refrain from scheduling the PDSCH during the slot.

32. The apparatus of claim 30, wherein the instructions are further executable by the processor to cause the apparatus to:
- determine that the identified plurality of downlink symbols is greater than the assigned set of downlink symbols; and
- truncate a set of unused downlink symbols associated with the slot, wherein scheduling the PDSCH is based at least in part on the truncating.

33. The apparatus of claim 32, wherein the instructions are further executable by the processor to cause the apparatus to:
- puncture the set of unused downlink symbols associated with the slot.

34. The apparatus of claim 28, wherein the instructions are further executable by the processor to cause the apparatus to:
- determine a minimum set of downlink symbols for transmission of the PDSCH carrying the broadcast information; and
- determine a maximum set of downlink symbols for transmission of the PDSCH carrying the broadcast information.

35. The apparatus of claim 25, wherein the instructions are further executable by the processor to cause the apparatus to:
- transmit the indication of the length of downlink symbols in a downlink control information (DCI) on a physical downlink control channel (PDCCH).

36. The apparatus of claim 25, wherein the instructions are further executable by the processor to cause the apparatus to:
- determine the length of downlink symbols used to transmit the PDSCH carrying broadcast information based at least in part on a preconfigured rule; and
- assign a bit value associated with a DCI field of the DCI, the bit value indicating the length of downlink symbols.

37. An apparatus for wireless communication, comprising:
- means for receiving, from a base station and while being outside of a radio resource control (RRC) connected state, an indication of a length of downlink symbols used to transmit a physical downlink shared channel (PDSCH) that carries broadcast information, the length being from a starting downlink symbol index to an ending downlink symbol index, wherein the indication of the length of downlink symbols used to transmit the PDSCH is received before a radio resource control (RRC) configuration procedure between the UE and the base station; and
- means for decoding the PDSCH based at least in part on the indication.

38. The apparatus of claim 37, further comprising:
- means for receiving a downlink control information (DCI) from the base station, wherein the indication of the length of downlink symbols used to transmit the PDSCH by the base station is received in the DCI.

39. The apparatus of claim 38, further comprising:
- means for identifying the length of downlink symbols used to transmit the PDSCH based at least in part on a bit value in a DCI field received in the DCI, wherein a demodulation reference signal (DMRS) pattern is associated with the bit value in the DCI field.

40. An apparatus for wireless communication, comprising:
- means for identifying, at a base station, an indication of a length of downlink symbols used to transmit a physical downlink shared channel (PDSCH) that carries broadcast information to a user equipment (UE) while the UE is outside of a radio resource control (RRC) connected state, the length being from a starting downlink symbol index to an ending downlink symbol index; and
- means for transmitting, before a radio resource control (RRC) configuration procedure between the UE and the base station, the indication to the UE.

41. The apparatus of claim 40, further comprising:
- means for transmitting the indication of the length of downlink symbols in a downlink control information (DCI) on a physical downlink control channel (PDCCH).

42. The apparatus of claim 40, further comprising:
- means for determining the length of downlink symbols used to transmit the PDSCH carrying broadcast information based at least in part on a preconfigured rule; and
- assigning a bit value associated with a DCI field of the DCI, the bit value indicating the length of downlink symbols.

43. A non-transitory computer-readable medium storing code for wireless communication, the code comprising instructions executable by a processor to:
- receive, from a base station and while being outside of a radio resource control (RRC) connected state, an indication of a length of downlink symbols used to transmit a physical downlink shared channel (PDSCH) that carries broadcast information, the length being from a starting downlink symbol index to an ending downlink symbol index, wherein the indication of the length of downlink symbols used to transmit the PDSCH is received before a radio resource control (RRC) configuration procedure between the UE and the base station; and
- decode the PDSCH based at least in part on the indication.

44. The non-transitory computer-readable medium of claim 43, further comprising code executable to:
- receive a downlink control information (DCI) from the base station, wherein the indication of the length of downlink symbols used to transmit the PDSCH by the base station is received in the DCI.

45. The non-transitory computer-readable medium of claim 44, further comprising code executable to:
- identify the length of downlink symbols used to transmit the PDSCH based at least in part on a bit value in a DCI field received in the DCI, wherein a demodulation reference signal (DMRS) pattern is associated with the bit value in the DCI field.

46. A non-transitory computer-readable medium storing code for wireless communication, the code comprising instructions executable by a processor to:
   identify, at a base station, an indication of a length of downlink symbols used to transmit a physical downlink shared channel (PDSCH) that carries broadcast information to a user equipment (UE) while the UE is outside of a radio resource control (RRC) connected state, the length being from a starting downlink symbol index to an ending downlink symbol index; and
   transmit, before a radio resource control (RRC) configuration procedure between the UE and the base station, the indication to the UE.

47. The non-transitory computer-readable medium of claim 46, further comprising code executable to:
   transmit the indication of the length of downlink symbols in a downlink control information (DCI) on a physical downlink control channel (PDCCH).

48. The non-transitory computer-readable medium of claim 46, further comprising code executable to:
   determine the length of downlink symbols used to transmit the PDSCH carrying broadcast information based at least in part on a preconfigured rule; and
   assign a bit value associated with a DCI field of the DCI, the bit value indicating the length of downlink symbols.

* * * * *